United States Patent
Kotov et al.

(10) Patent No.: US 10,795,186 B2
(45) Date of Patent: Oct. 6, 2020

(54) ENHANCEMENT OF FORWARD SCATTERING, SUPPRESSION OF BACKSCATTERING, AND SPECTRAL TUNING OF OPTICAL HEDGEHOG PARTICLES

(71) Applicant: The Regents of The University of Michigan, Ann Arbor, MI (US)

(72) Inventors: Nicholas A. Kotov, Ypsilanti, MI (US); Joong Hwan Bahng, Ann Arbor, MI (US)

(73) Assignee: THE REGENTS OF THE UNIVERSITY OF MICHIGAN, Ann Arbor, MI (US)

(*) Notice: Subject to any disclaimer, the term of this patent is extended or adjusted under 35 U.S.C. 154(b) by 86 days.

(21) Appl. No.: 15/826,081

(22) Filed: Nov. 29, 2017

(65) Prior Publication Data
US 2018/0149887 A1    May 31, 2018

Related U.S. Application Data

(60) Provisional application No. 62/428,140, filed on Nov. 30, 2016.

(51) Int. Cl.
*G02F 1/00*    (2006.01)
*G02B 1/10*    (2015.01)
(Continued)

(52) U.S. Cl.
CPC .............. *G02F 1/0063* (2013.01); *C01G 9/02* (2013.01); *C08J 3/20* (2013.01); *C08J 5/12* (2013.01);
(Continued)

(58) Field of Classification Search
CPC ............. G02F 1/0063; G02F 1/133504; G02F 1/133606; G02B 1/10; G02B 5/0242; G02B 5/0294; G02B 6/0016; G02B 6/004
See application file for complete search history.

(56) References Cited

U.S. PATENT DOCUMENTS

| | | | |
|---|---|---|---|
| 2012/0273662 A1* | 11/2012 | Caldwell | G01N 21/658 250/214.1 |
| 2014/0319502 A1 | 10/2014 | Umemoto | |
| 2017/0205701 A1* | 7/2017 | Ide | G03B 21/62 |

FOREIGN PATENT DOCUMENTS

EP    2940743 A1    11/2015

OTHER PUBLICATIONS

Elias et al. "Hollow Urachin-like ZnO thin films by electrochemical deposition" 2010, Advance Materials, 22, 1607-1612 (Year: 2010).*

(Continued)

*Primary Examiner* — William R Alexander
*Assistant Examiner* — Ephrem Z Mebrahtu
(74) *Attorney, Agent, or Firm* — Harness, Dickey & Pierce, P.L.C.

(57) ABSTRACT

Optical materials for optical devices are provided that comprise a plurality of hedgehog-shaped microparticles. Each hedgehog microparticle comprises a core region formed of a first material having a first refractive index and a plurality of needles connected to and substantially orthogonal to a surface of the core region. The needles comprise a second material having a second refractive index. The optical material enhances forward scattering of a predetermined wavelength of light, while suppressing backscattering of the predetermined wavelength of light. Methods of controlling transparency in an optical material comprising a plurality of hedgehog microparticles, while suppressing backscattering are also provided. Spectral tuning with use of such optical materials is also provided.

22 Claims, 27 Drawing Sheets

(51) Int. Cl.
  *C01G 9/02* (2006.01)
  *C08J 3/20* (2006.01)
  *C08J 5/12* (2006.01)
  *C08J 5/18* (2006.01)
  *C08K 3/36* (2006.01)
  *G02B 5/02* (2006.01)

(52) U.S. Cl.
  CPC .................. *C08J 5/18* (2013.01); *C08K 3/36* (2013.01); *G02B 1/10* (2013.01); *G02B 5/0242* (2013.01); *G02B 5/0294* (2013.01)

(56) References Cited

OTHER PUBLICATIONS

Ko, Yeong Hwan, and Jae Su Yu. "Urchin-aggregation inspired closely-packed hierarchical ZnO nanostructures for efficient light scattering." Optics express 19, No. 27 (2011): 25935-25943.

Qu, Jie, Yongan Yang, Qingduan Wu, Paul R. Coxon, Yingjun Liu, Xiong He, Kai Xi, Ningyi Yuan, and Jianning Ding. "Hedgehog-like hierarchical ZnO needle-clusters with superior electron transfer kinetics for dye-sensitized solar cells." RSC Advances 4, No. 22 (2014): 11430-11437.

Bahng, Joong Hwan, et al. "Anomalous dispersions of 'hedgehog' particles." Nature 517.7536 (2015): 596.

* cited by examiner

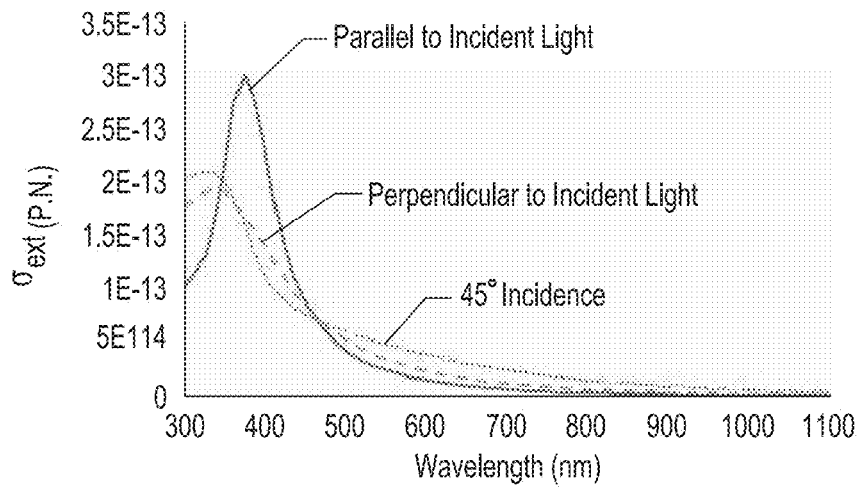
*Fig-12*
w = 75 nm
N = 500
w = 100 nm
N = 500
w = 120 nm
N = 500
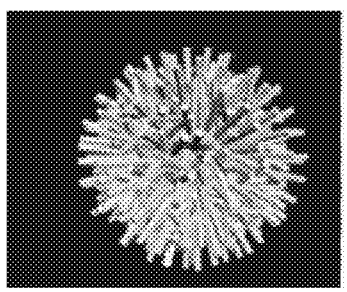
*Fig-13A*
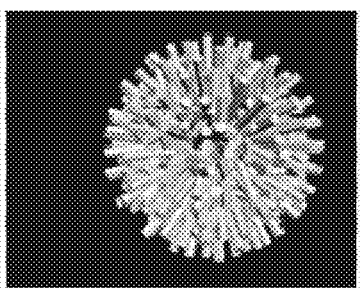
*Fig-13B*
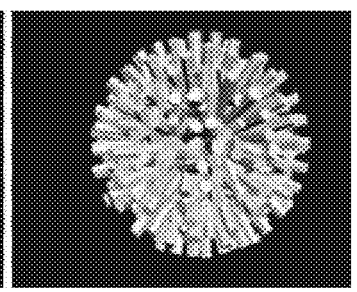
*Fig-13C*
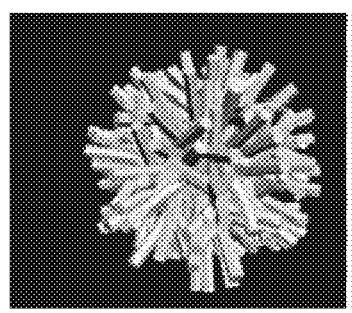
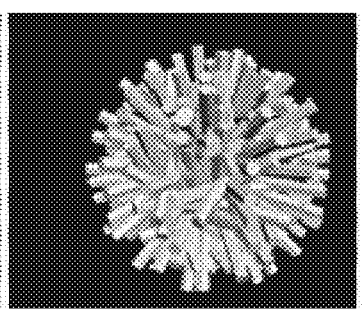
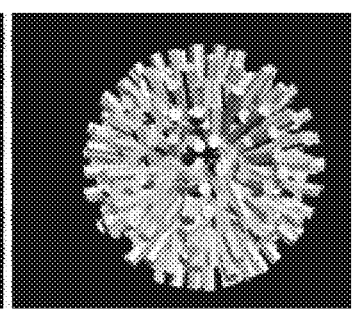
N = 250
w = 120 nm
N = 350
w = 120 nm
N = 500
w = 120 nm
*Fig-13D*
*Fig-13E*
*Fig-13F*

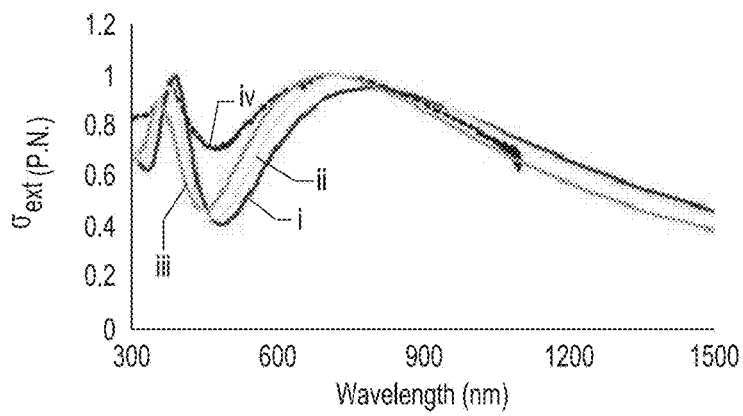
*Fig-18A*
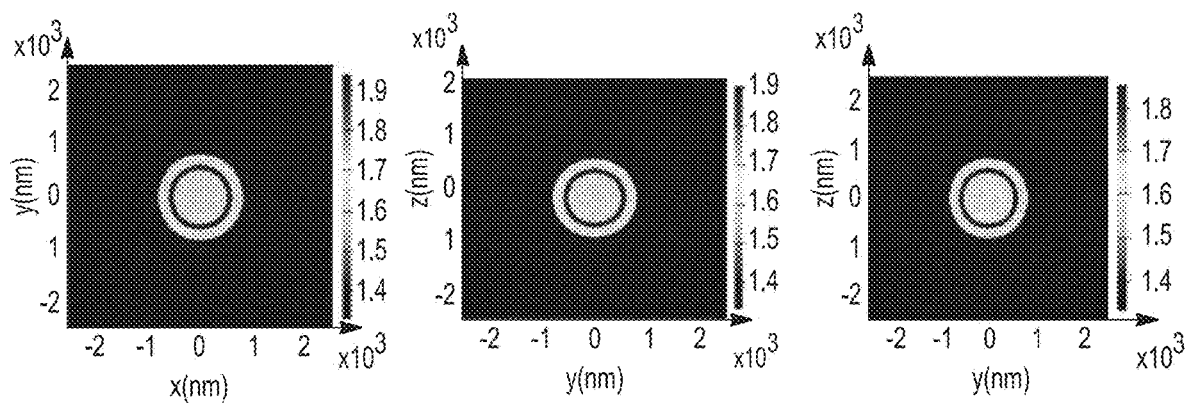
*Fig-18B*  *Fig-18C*  *Fig-18D*
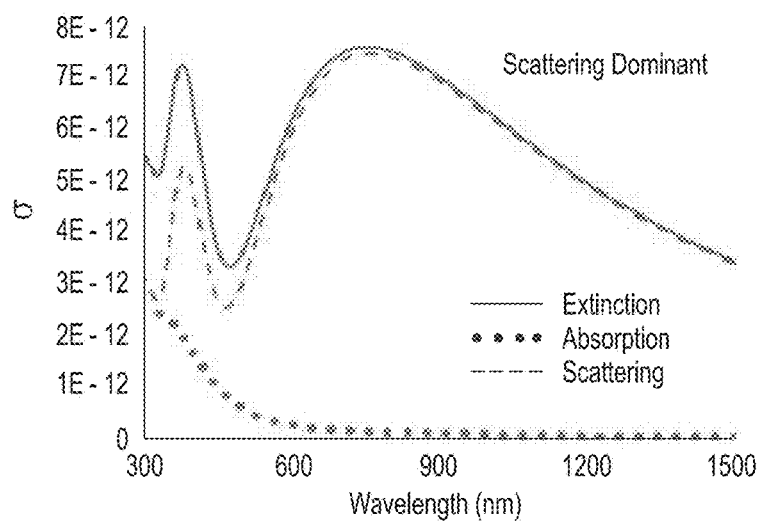
*Fig-19*

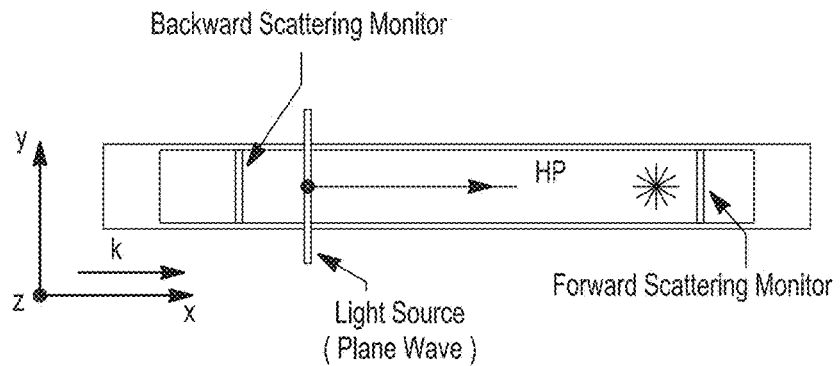
*Fig-22A*
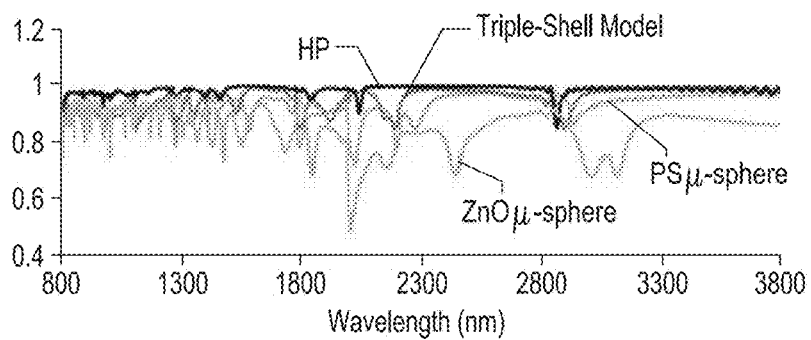
*Fig-22B*
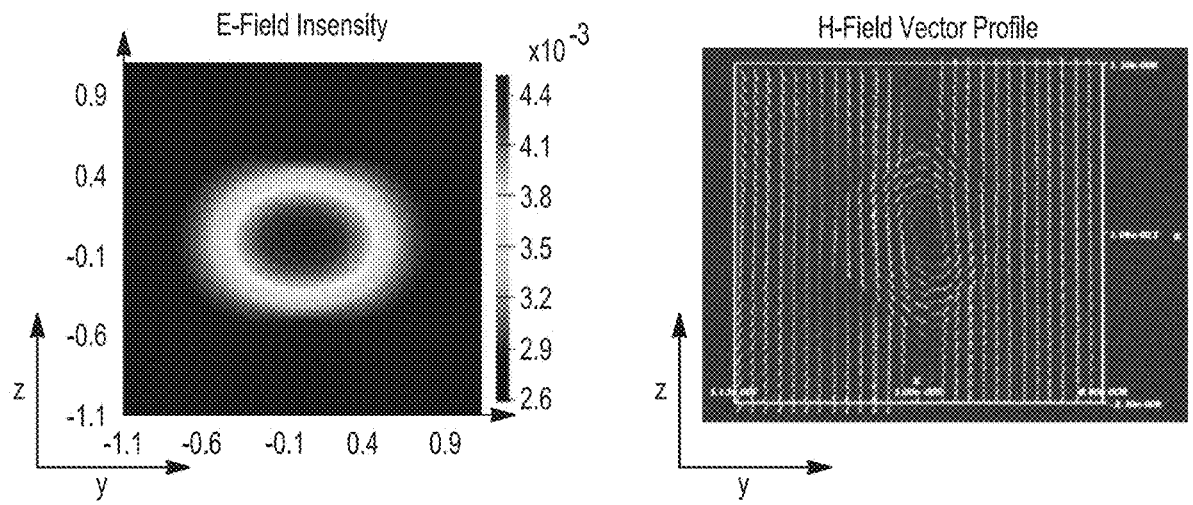
*Fig-23A*          *Fig-23B*

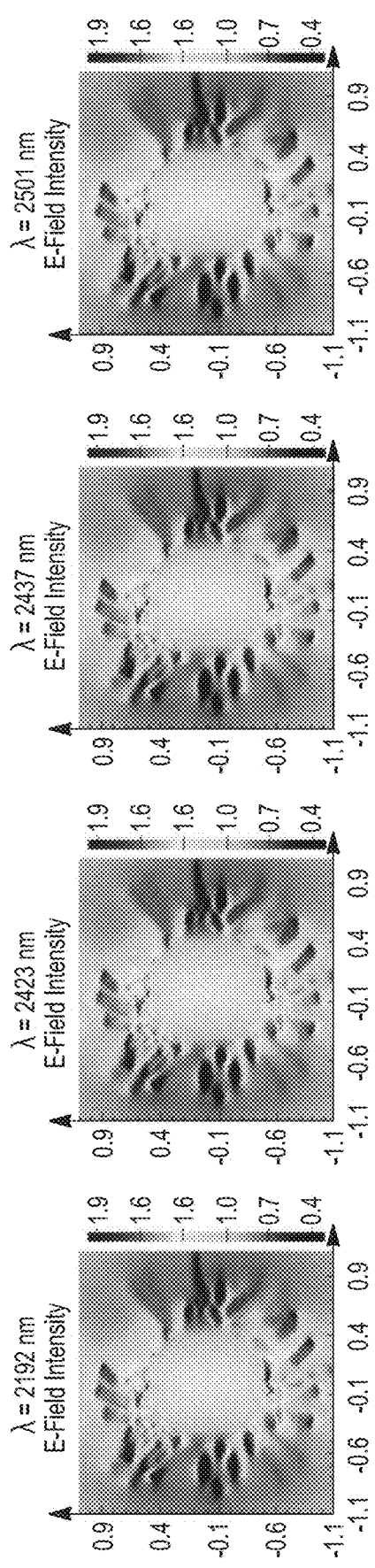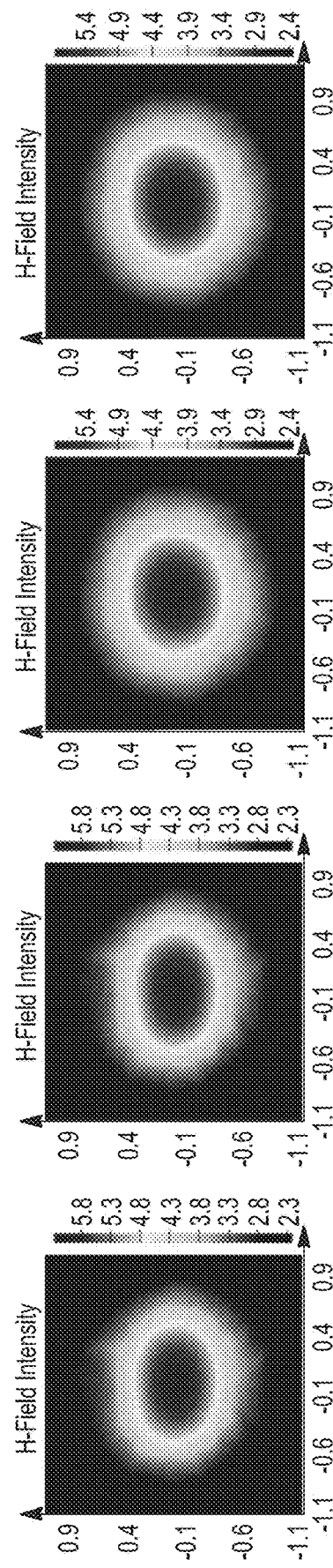

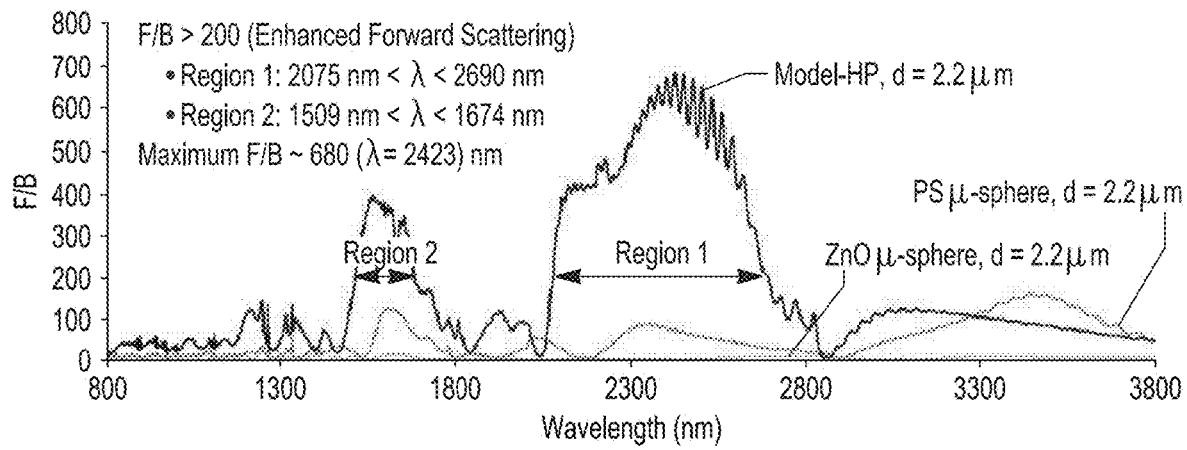
*Fig-40*
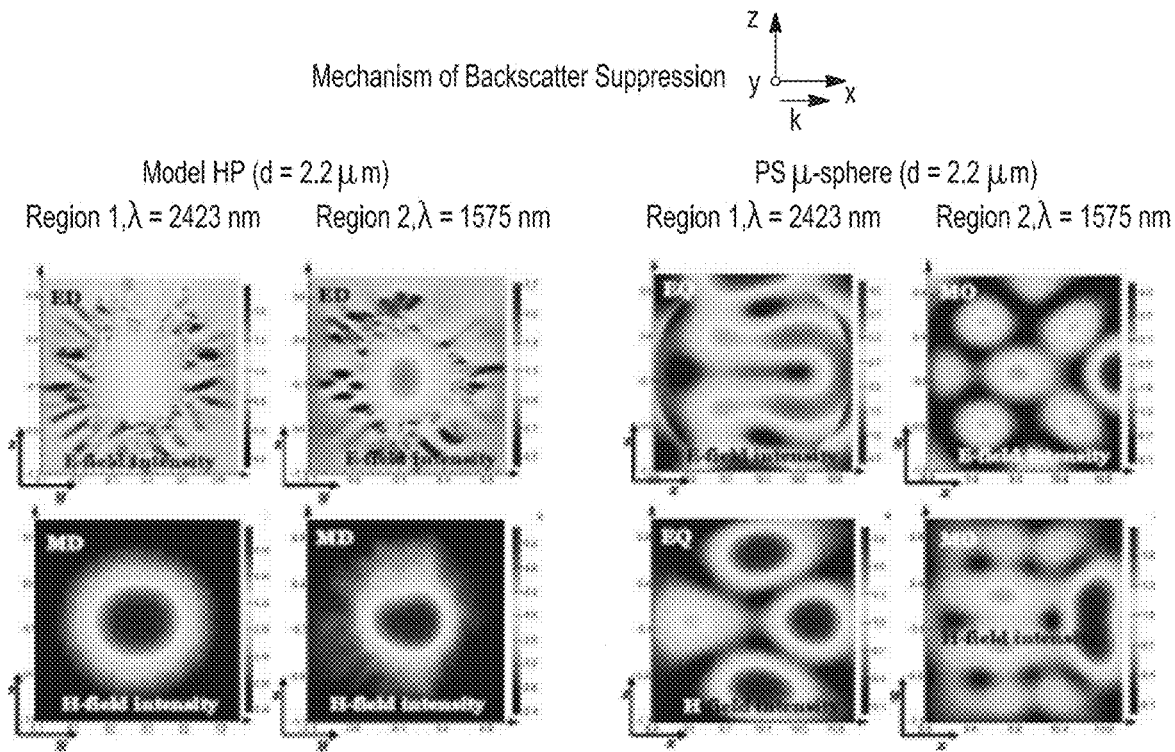
- Spectral Overlap Between ED and MD Modes Causes Destructive Interface in Backscattering
*Fig-41A*   *Fig-41B*

ENHANCEMENT OF FORWARD SCATTERING, SUPPRESSION OF BACKSCATTERING, AND SPECTRAL TUNING OF OPTICAL HEDGEHOG PARTICLES

CROSS-REFERENCE TO RELATED APPLICATIONS

This application claims the benefit of U.S. Provisional Application No. 62/428,140, filed on Nov. 30, 2016. The entire disclosure of the above application is incorporated herein by reference.

GOVERNMENT SUPPORT

This invention was made with government support under Award No. W911NF-12-1-0407 awarded by the U.S. Army Research Office. The government has certain rights in the invention.

FIELD

The present disclosure relates to enhanced optical materials comprising at least one hedgehog particle that provides controlled transparency, including enhanced forward scattering, suppressed backscattering, and spectral tuning.

BACKGROUND

This section provides background information related to the present disclosure which is not necessarily prior art.

Light scattering is one of the most common physical optical phenomena. Control of light scattering is essential for a plethora of optical technologies for various optical devices; however, it is considered to be difficult to control. Random scattering is widely used in obscurants, which have strong backscattering and virtually no transparency windows in visible and infrared ranges of electromagnetic radiation. It would be desirable to develop optical materials, such as media and thin films, having controlled back and forward scattering. More specifically, it would be advantageous to provide optical materials that enable patterning of light scattering, where controlled forward scattering can provide desired transparency windows for select wavelengths of light, while backscattering is ideally suppressed for the same wavelengths of light. Such optical materials would be useful in a variety of optical devices, including various electrooptical devices, such as displays and solar cells.

SUMMARY

This section provides a general summary of the disclosure, and is not a comprehensive disclosure of its full scope or all of its features.

In certain aspects, the present disclosure provides an optical device. The optical device may comprise an optical material comprising a plurality of microparticles. Each respective microparticle comprises a core region formed of a first material having a first refractive index. Each respective microparticle also comprises a plurality of spikes or needles connected to and substantially orthogonal to a surface of the core region. The plurality of needles comprises a second material having a second refractive index. The optical material enhances forward scattering of a predetermined wavelength of light, while suppressing backscattering the predetermined wavelength of light.

In further aspects, the first material may be selected from the group consisting of: polystyrene and silica.

In other aspects, the second material optionally comprises zinc oxide (ZnO).

In still further aspects, each needle further comprises a third material coated over the second material. The third material may be selected from the group consisting of: coated titania ($TiO_2$), gold nanoparticles, silver nanoparticles, CdTe quantum dots, and combinations thereof.

In other aspects, each respective needle of the plurality has an average length of greater than or equal to about 200 nm to less than or equal to about 750 nm.

In further aspects, each respective core has an average diameter of greater than or equal to about 900 nm to less than or equal to about 5 μm.

In certain aspects, the predetermined wavelength of light is infrared or near-infrared electromagnetic radiation.

In certain other aspects, the optical material is a film comprising the plurality of microparticles.

In yet other aspects, the optical material is coating comprising the plurality of microparticles deposited on a substrate.

In further aspects, the optical material comprises the plurality of microparticles distributed in air.

In still further aspects, greater than or equal to about 50% of the predetermined wavelength of light directed at the optical material is transmitted through the optical material.

In other aspects, greater than or equal to about 99% of the predetermined wavelength of light directed at the optical material is transmitted through the optical material and less than 1% of the predetermined wavelength of light backscatters.

In yet other aspects, greater than or equal to about 65% of the predetermined wavelength of light directed at the optical material is transmitted through the optical material where the predetermined wavelength ranges from greater than or equal to about 1,400 nm to less than or equal to about 1,600 nm.

In certain other aspects, greater than or equal to about 75% of the predetermined wavelength of light directed at the optical material is transmitted through the optical material, where the predetermined wavelength ranges from greater than or equal to about 800 nm to less than or equal to about 887 nm.

In other aspects, the optical material has a ratio of forward scattering to backscattering of greater than or equal to about 200.

In further aspects, the predetermined wavelength ranges from greater than or equal to about 1,236 nm to less than or equal to about 1,655 nm.

In other aspects, the present disclosure provides a method of controlling transparency in an optical material. The method may comprise directing a predetermined wavelength of light towards an optical material comprising a plurality of microparticles having a forward scattering to backscattering ratio of greater than or equal to about 200 for the predetermined wavelength of light. Each respective microparticle comprises a core region formed of a first material having a first refractive index and a plurality of needles connected to and substantially orthogonal to a surface of the core region. The plurality of needles comprises a second material having a second refractive index, which is distinct from the first refractive index.

In certain aspects, greater than or equal to about 99% of the predetermined wavelength of light directed towards the optical material is transmitted through the optical material and less than 1% of the predetermined wavelength of light backscatters.

In other aspects, greater than or equal to about 65% of the predetermined wavelength of light directed towards the optical material is transmitted through the optical material, where the predetermined wavelength ranges from greater than or equal to about 1,400 nm to less than or equal to about 1,600 nm.

In further aspects, greater than or equal to about 75% of the predetermined wavelength of light directed towards the optical material is transmitted through the optical material, where the predetermined wavelength ranges from greater than or equal to about 800 nm to less than or equal to about 887 nm.

In still further aspects, the predetermined wavelength ranges from greater than or equal to about 1,236 nm to less than or equal to about 1,655 nm.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1L. FIGS. 1A-1D show formation of hedgehog particles (HPs). FIG. 1A shows a carboxylated PS μ-sphere used as a template. FIG. 1B shows ZnO NPs seeded onto the template through electrostatic adsorption, after which FIGS. 1C-1D show ZnO needles/nanospikes grown to different specific lengths. FIG. 1E shows scanning electron microscopy (SEM) image of HPs. FIGS. 1F-1I show SEM images of HPs with ZnO nanospikes of different lengths (l), in FIG. 1F the nanospike length (l)=0.19 μm, in FIG. 1G, l=0.27 μm, in FIG. 1H, l=0.4 μm, and in FIG. 1I, l=0.6 μm. In FIGS. 1J-1L, SEM images of HPs with ZnO nanospikes of different widths (w) are shown. In FIG. 1J, w=0.19 μm, in FIG. 1K, w=0.27 μm, and in FIG. 1L, w=0.4 μm are shown. Scale bars are all 1 μm.

FIGS. 2A-2C. FIGS. 2A-2C show peak normalized (P.N.) UV-Vis extinction spectra of HPs in an aqueous suspension. FIG. 2A shows P.N. extinction spectra (absorbance unit, A.U.) of ZnO nanowires (NWs), PS μ-spheres, and HPs. FIGS. 2B-2C show P.N. extinction spectra of HPs with FIG. 2B varying spike lengths, including l=190 nm, l=270 nm, l=400 nm, and l=600 nm. FIG. 2C shows varying spike widths, w=100 nm, w=120 nm, and w=135 nm, in aqueous suspensions.

FIGS. 3A-3C. FIG. 3A shows broadband suppression of backscattering by net power flow (normalized power—P) versus wavelength. FIG. 3B shows transmission versus wavelength, and FIG. 3C shows broadband enhancement of forward scattering ratio (or transmission to reflection ratio—FB) for 2 comparative ZnO and PS μ-sphere particles, as compared to a hedgehog particle prepared in accordance with certain aspects of the present disclosure.

FIGS. 4A-4C. FIG. 4A shows reflectance versus wavelength, FIG. 4B shows transmission versus wavelength, and FIG. 4C shows a forward to backscattering ratio (or transmission to reflection ratio) for 2 comparative ZnO and PS μ-sphere particles as compared to a hedgehog particle prepared in accordance with certain aspects of the present disclosure.

FIG. 5 shows extinction versus wavelength for 2 comparative PS μ-sphere particles of distinct diameters (1 μm and 2.2 μm) as compared to a hedgehog particle prepared in accordance with certain aspects of the present disclosure.

FIGS. 6A-6F. A theoretical calculation of extinction cross-section ($\sigma_{ext}$) of HP in water using FDTD method. FIGS. 6A-6B show $\sigma_{ext}$ (P.N.) of model HP (M-HP). In FIG. 6A, variations in nanoneedle/nanospike width (w) are shown (with constant l=600 nm and N=500), where the w=120 nm, w=100 nm, and w=75 nm. FIG. 6B shows variations in needle density N (with constant l=600 nm and w=120 nm), where N=500, N=350, and N=250. FIG. 6C shows excellent agreement between theoretical and experimental measurement (perforated line). FIG. 6D shows evolution of $\sigma_{ext}$ starting from single nanoneedle/nanospike and PS μ-sphere (red) to ZnO nanoneedle/nanospike (N=500, l=120 nm, w=120 nm) in a spherical array (perforated line) to the HP (green). FIGS. 6E-6F show electric field profiles at the center cross-section perpendicular to plane wave light propagation (λ=1004 nm) through FIG. 6E ZnO nanoneedles/nanospikes (N=500, l=600 nm, w=120 nm) in spherical array format and FIG. 6F for HP.

FIGS. 7A-7D. FIGS. 7A-7D show FDTD solutions of M-HP in air.

FIG. 7A shows excellent agreement in the extinction line shape between the M-HP (N=300, l=600 nm w=120 nm) and the experimental measurement (perforated line) in air. FIG. 7B shows FDTD solutions of $\sigma_{ext}$ of PS μ-sphere of r=0.5 μm and r=1.1 μm in radius and the triple-shell model, r=1.1 μm showing a series of sharp resonant peaks within coarse oscillations. The M-HP shows suppressed ripples indicative of non-resonant scattering. E-field intensity showing coupling effect in FIG. 7C is between a pair of PS μ-spheres and coupling-free effect, while FIG. 7D is between a pair of M-HPs. The particles are aligned perpendicular to incident plane wave polarized in the z-direction and propagating along the x-direction and at zero separation distance (s=0).

FIGS. 8A-8J. FIGS. 8A-8J show broadband suppression of backscattering and enhancement of forward scattering exhibited by M-HP through FDTD-based simulation. FIG. 8A shows normalized power transmission monitored behind the radiation source showing broadband suppression of backscattering and FIG. 8B shows high forward scattering to backward scattering ratio (FB) exhibited by the M-HP, (r=1.1 μm) compared with PS μ-sphere (r=1.1 μm), ZnO μ-sphere (r=1.1 μm) and the triple-shell model (r=1.1 μm). The PS μ-sphere of equivalent diameter to HP exhibits in FIGS. 8C-8D H-field intensity profiles that indicate excitation of magnetic quadrupole mode (MQ). FIG. 8E shows E-field and FIG. 8F shows H-field intensity profiles that indicate excitation of magnetic octupole mode (MO) when irradiated with plane wave at λ=2437 nm and λ=1575 nm, respectively. Meanwhile, FIGS. 8G and 8I show E-field intensity profiles and FIGS. 8H and 8J show H-field intensity profiles that indicate co-excitation of ED and MD modes in an M-HP, at both λ=2437 nm and λ=1575 nm. All plane waves are polarized in the z-direction and propagates along the x-direction.

FIGS. 9A-9B. FIGS. 9A-9B show comparison of peak normalized (P.N.) extinction spectra in absorbance unit (A.U.) from UV-Vis spectroscopy, denoted as solid line, and extinction cross-section ($\sigma_{ext}$) from the FDTD-based calculations, denoted as a perforated line. In FIG. 9A, a PS µ-sphere has radius (r)=500 nm, while in FIG. 9B, ZnO nanowires (NWs) have a width (w)=120 nm and length (l)=600 nm.

FIGS. 10A-10D. FIGS. 10A-10D show spectral contribution to $\sigma_{ext}$ in a single ZnO nanospike in water. FIGS. 10A-10B show a single ZnO nanospike where in FIG. 10A, absorption cross-section ($\sigma_{abs}$), and in FIG. 10B, scattering cross-section ($\sigma_{scat}$), are shown for lengths (l)=190 nm, 270 nm, 400 nm, and 600 nm. FIGS. 10C-10D show peak normalized for FIG. 10C $\sigma_{abs}$ and FIG. 10D $\sigma_{scat}$ from FIG. 10A and FIG. 10B, respectively. The width of nanoneedles/nanospikes are w=120 nm for all the lengths considered.

FIGS. 11A-11C. FIGS. 11A-11C show spectral contribution to $\sigma_{ext}$ in a single ZnO needle/nanospike (of different width). FIGS. 11A-11B show peak normalized in FIG. 11A for $\sigma_{abs}$, in FIG. 11B for $\sigma_{scat}$, and in FIG. 11C for $\sigma_{ext}$ of a ZnO nanospike with width (w)=50 nm, 75 nm, 100 nm, 120 nm, 150 nm, and 200 nm. The length of the ZnO nanospike is l=600 nm for all widths considered.

FIG. 12 shows $\sigma_{ext}$ of a ZnO nanowire (NW) (w=120 nm, l=600 nm) in water at various orientations relative to the incident plane wave; parallel to the incident light (solid line), at 45° angle of incidence (dotted line) and perpendicular to the incident light (perforated line).

FIGS. 13A-13F. FIGS. 13A-13F show a model hedgehog particle (M-HP) constructed from computed aided design software (3D Max Studio). The model HP is constructed by layering ZnO nanopyramids on PS µ-sphere onto which the ZnO nanospikes are scattered to create imperfect orthogonalization that reflects the experimental construct. The spherical format of ZnO nanospikes only (without the nanopyramids) are exported to the FDTD based simulation software (FDTD Solutions, Lumerical Inc.) in which PS µ-sphere is inserted in a way that there is no void space between the spherical array of ZnO nanospikes and the µ-sphere. FIG. 13A shows a width (w) of 75 nm and a needle density (N) of 500, while FIG. 13B shows w=100 nm and N=500, FIG. 13C shows w=120 nm and N=500, FIG. 13D shows w=120 nm and N=250, FIG. 13E shows w=120 nm and N=350, and FIG. 13F shows w=120 nm and N=500.

FIGS. 14A-14B. FIGS. 14A-14B show FDTD based theoretical calculation of $\sigma_{ext}$ of HP in water using FDTD method. FIG. 14A shows P.N. $\sigma_{ext}$ of two HPs at a separation distance, d=700 nm. The line labeled "i" corresponds to 2 HPs, each having N=500, w=120 nm, l=600 nm. The line labeled "ii" corresponds to 2 HPs, each having N=500, w=100 nm, l=600 nm. The line labeled "iii" corresponds to 2 HPs, where one HP is comprised of N=500, w=100 nm, l=600 nm and the other HP is comprised of N=500, w=120 nm, l=600 nm. The $\sigma_{ext}$ of the heterogeneous mixture (iii) lies in between that of the two homogenous mixtures (i, ii). FIG. 14B shows there is an excellent spectral overlap between the FDTD-based $\sigma_{ext}$ of 2 HP mixture (iv, in FIG. 14A, solid line in FIG. 14B) and spectroscopic measurement of a collection of HPs in aqueous suspension (perforated line). The spectroscopic measurement is representative of average light extinction due to a collection of HPs having slight variations in overall interfacial geometry.

FIG. 15 shows spectral contribution $\sigma_{ext}$ in a single hedgehog particle (HP); contribution of $\sigma_{abs}$ (dotted) and $\sigma_{scat}$ (perforated) to the total $\sigma_{ext}$ of a single HP (N=500, w=120 nm and l=600 nm).

FIGS. 16A-16E. FIGS. 16A-16E show electric field (E-field) coupling between the ZnO nanospikes in a 3×3 array and its spectral shift. FIGS. 16A-16D show 3×3 array of parallel ZnO nanospikes (w=120 nm, l=600 nm) oriented parallel to the incident light (λ=400 nm and λ=704 nm) at separation distance (d) of FIG. 16A d=20 nm, FIG. 16B, d=50 nm, FIG. 16C, d=100 nm, and FIG. 16D, d=200 nm. FIG. 16E shows $\sigma_{ext}$ of orientations in FIGS. 16A-16D.

FIGS. 17A-17D. FIGS. 17A-17D show discretized gradient refractive index triple-shell model; triple-shell model having 1:1:1 thickness ratios with step-wise variations in refractive indices, where the refractive index of each shell layers are determined by Maxwell Garnett effective medium approximations. FIG. 17A shows FDTD simulations of $\sigma_{ext}$ of the triple-shell model that corresponds to HPs having w=120 m, l=600 nm and N=275 (labelled "i"), N=265 (labeled "ii"), N=250 (labeled "iii"). The perforated black line (iv) represents the spectroscopic measurement (A.U.) of HPs in aqueous suspension. Refractive index representation of the 1:1:1 triple-shell that corresponds to FIG. 17B N=275 ($f_{outer}$=0.27, $f_{middle}$=0.42, $f_{inner}$=0.75), FIG. 17C N=275 ($f_{outer}$=0.26, $f_{middle}$=0.41, $f_{inner}$=0.72), and FIG. 17D N=250 ($f_{outer}$=0.25, $f_{middle}$=0.39, $f_{inner}$=0.68), where f is the volume fraction of ZnO.

FIGS. 18A-18D. FIGS. 18A-18D show discretized gradient refractive index triple-shell model; triple-shell model having 3:2:1 (outer:middle:inner) thickness ratios with step-wise variations in refractive indices, where the refractive index of each shell layers are determined by Maxwell Garnett effective medium approximations. FIG. 18A shows FDTD simulations of $\sigma_{ext}$ of the triple-shell model that corresponds to HPs having w=120 m, l=600 nm and N=275 (labeled "i"), N=265 (labeled "ii"), N=250 (labeled "iii"). The perforated black line (labeled "iv") represents the spectroscopic measurement (A.U.) of HPs in aqueous suspension. Refractive index representation of the 3:2:1 triple-shell that corresponds to the FIG. 18B N=275 ($f_{outer}$=0.3, $f_{middle}$=0.55, $f_{inner}$=0.90), FIG. 18C N=265 ($f_{outer}$=0.29, $f_{middle}$=0.53, $f_{inner}$=0.87), and FIG. 18D N=250 ($f_{outer}$=0.27, $f_{middle}$=0.50, $f_{inner}$=0.82),), where f is the volume fraction of ZnO.

FIG. 19 shows spectral contribution to $\sigma_{ext}$ in a triple-shell model; contribution of $\sigma_{abs}$ (dotted) and $\sigma_{scat}$ (perforated) to the total $\sigma_{ext}$ of a single triple-shell representation of HP (N=265, w=120 nm and l=600 nm, 1:1:1).

FIGS. 20A-20B. FIGS. 20A-20B show $\sigma_{ext}$ of two parallel particles aligned perpendicular to the incident TFSF plane wave (λ=300-1500 nm). FIG. 20A shows spectral overlap between the $\sigma_{ext}$ of a single M-HP and two M-HPs aligned perpendicular to the incident plane wave. FIG. 20B shows spectral modulation between the $\sigma_{ext}$ of a single PS µ-sphere and two PS µ-spheres (r=1.1 µm) aligned perpendicular to incident plane wave.

FIGS. 21A-21B. FIGS. 21A-21B show electric field (E-field) intensity distribution of two parallel particles (at zero separation distance, s=0 nm) aligned perpendicular to the incident plane wave. FIG. 21A shows two PS µ-spheres (r=1.1 µm) and FIG. 21B shows two M-HPs aligned perpendicular to the incident plane wave (z-polarized and propagating along x-direction, λ=454 nm) at zero separation distance. E-field coupling is observed at the near-field between the PS µ-spheres, while coupling-free behavior is observed between the M-HPs.

FIGS. 22A-22B. FIGS. 22A-22B show normalized power transmission. FIG. 22A shows an FDTD simulation setup that includes monitors for power transmission behind the source plane wave for backscattering and behind the particle for forward scattering. FIG. 22B shows enhanced forward scattering exhibited by the HP compared with PS and ZnO µ-spheres. The PS µ-sphere has r=1.1 µm, ZnO µ-sphere has r=1.1 µm) and triple-shell model has r=1.1 µm.

FIGS. 23A-23B. FIGS. 23A-23B show near-field profile in the PS μ-sphere of r=0.5 μm, representing the core of the HP, H-field intensity is shown in FIG. 23A and vector profile is shown in FIG. 23B, irradiated with plane wave (z-polarized and propagating along the x-direction) of λ=2323 nm.

FIGS. 24A-24H. FIGS. 24A-24H show near-field profiles in the M-HP showing co-excitation of ED and MD modes across the spectrum in Region 1 (2075<λ<2690). FIGS. 24A, 24C, 24E, and 24G show E-field intensity and FIGS. 24B, 24D, 24F, and 24H show H-field intensity profiles at λ=2192 nm, 2423 nm, 2437 nm, 2501 nm, respectively.

FIGS. 25A-25B. FIGS. 25A-25B show near-field intensity profiles in the PS μ-sphere of equivalent diameter to the HP (r=1.1 μm). FIG. 25A shows E-field and FIG. 25B shows H-field intensity profile showing excitation of EQ mode, irradiated with plane wave (z-polarized and propagating along the x-direction) of λ=2192 nm.

FIG. 26 shows a near-field profile in the PS-ZnO core-shell (core r=0.5 μm, shell thickness t=0.6 μm) showing excitation of higher order modes, irradiated with plane wave, λ=1575 nm.

FIGS. 27A-27D. FIGS. 27A-27D show near-field profiles in the PS μ-sphere of equivalent diameter to HP (r=1.1 μm) showing excitation of magnetic octupole (MO) mode when irradiated with plane wave of λ=1575 nm (z-polarized, propagating along x-direction). FIG. 27A shows E-field intensity, FIG. 27B shows H-field intensity, FIG. 27C shows E-field vector, and FIG. 27D shows H-field vector profiles.

Figure 31A:
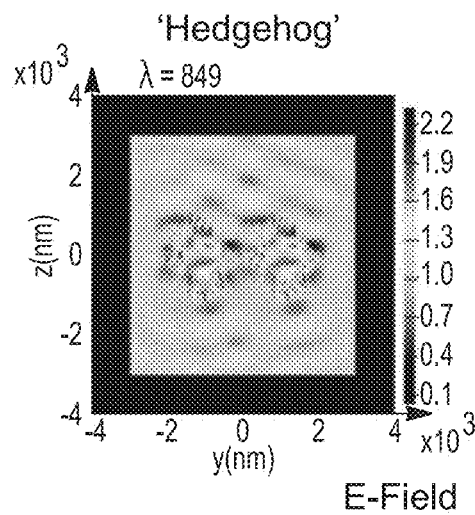
Figure 31B:
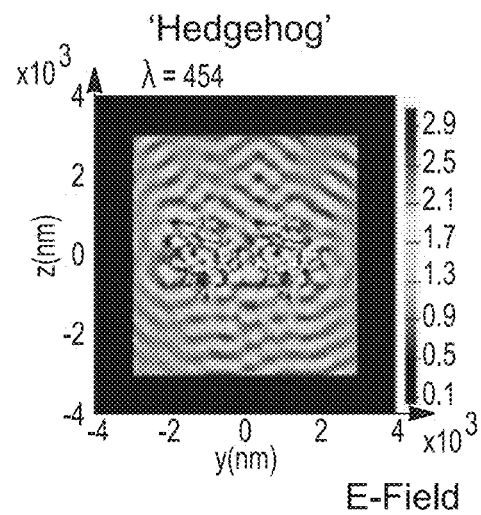
Figure 31C:
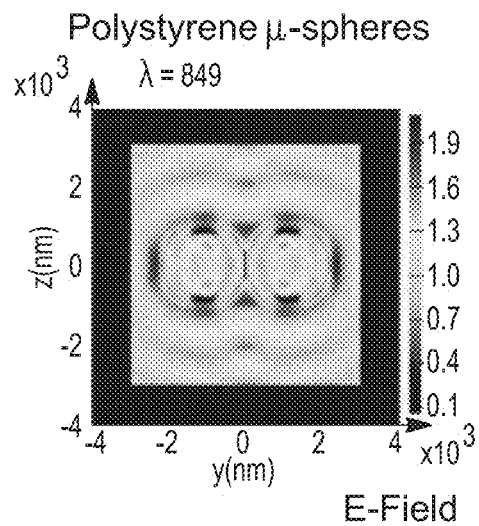
Figure 31D:
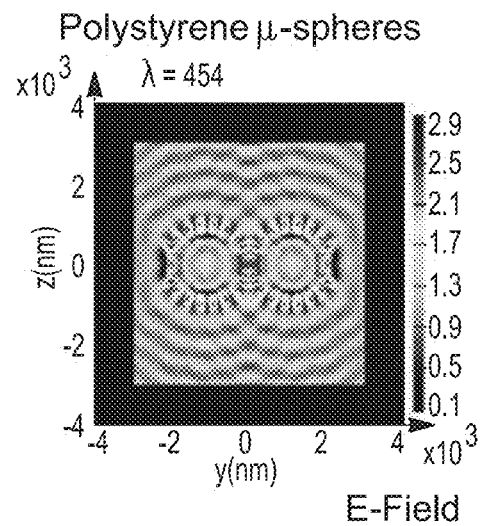

FIGS. 31A-31D. FIGS. 31A-31B show Electric field (E-field) intensity distribution for two side-by-side hedgehog particles prepared in accordance with certain aspects of the present disclosure with no separation distance (λ of 849 nm in FIG. 31A and λ of 454 nm in FIG. 31B), where a coupling-free effect is observed between hedgehog particles. FIGS. 31C-31D show E-Field intensity for two comparative side-by-side polystyrene microspheres, where a coupling effect is shown.

Figure 32:
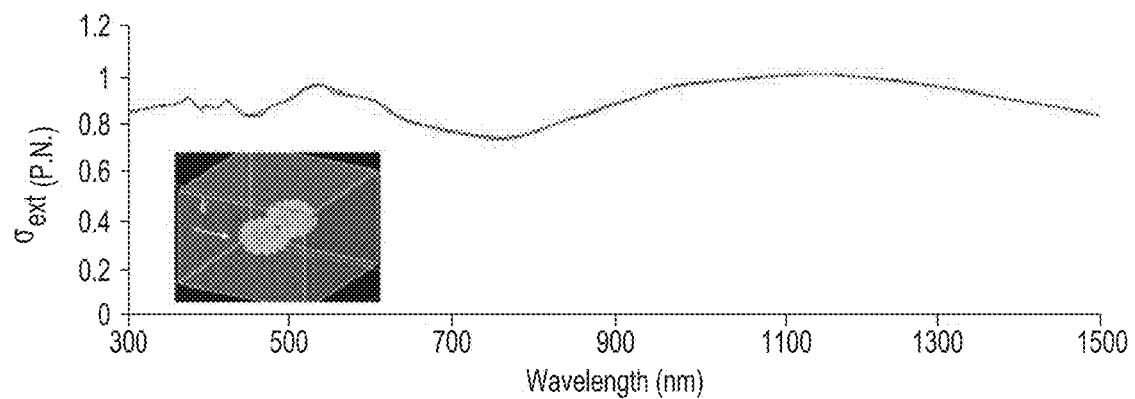

FIG. 32 shows non-resonant scattering of a model hedgehog particle in air with extinction ($\sigma_{ext}$) versus wavelength for hedgehog particles prepared in accordance with certain aspects of the present disclosure.

Figure 33:
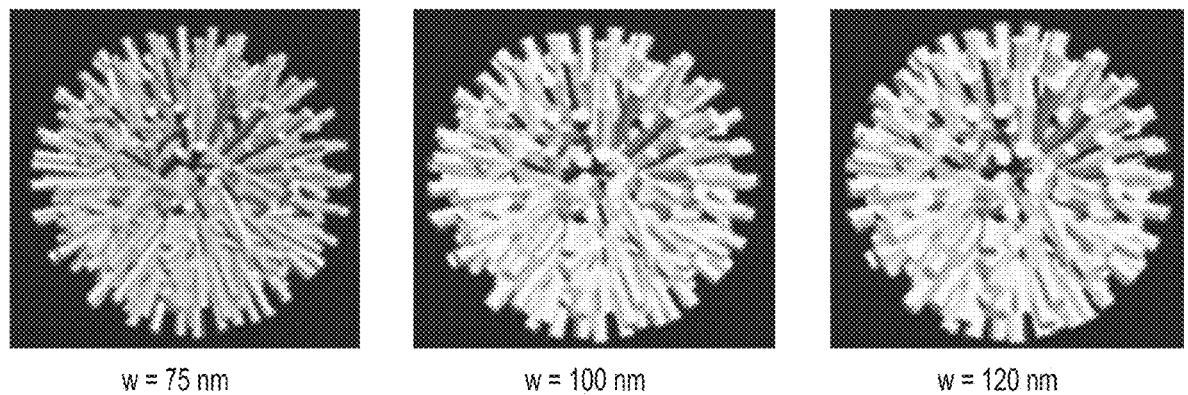

FIG. 33 shows variations in different hedgehog particles prepared in accordance with certain aspects of the present disclosure, where the hedgehog particles have nanospikes or needles with different widths, namely w=75 nm, w=100 nm, and w=120 nm.

Figure 34:
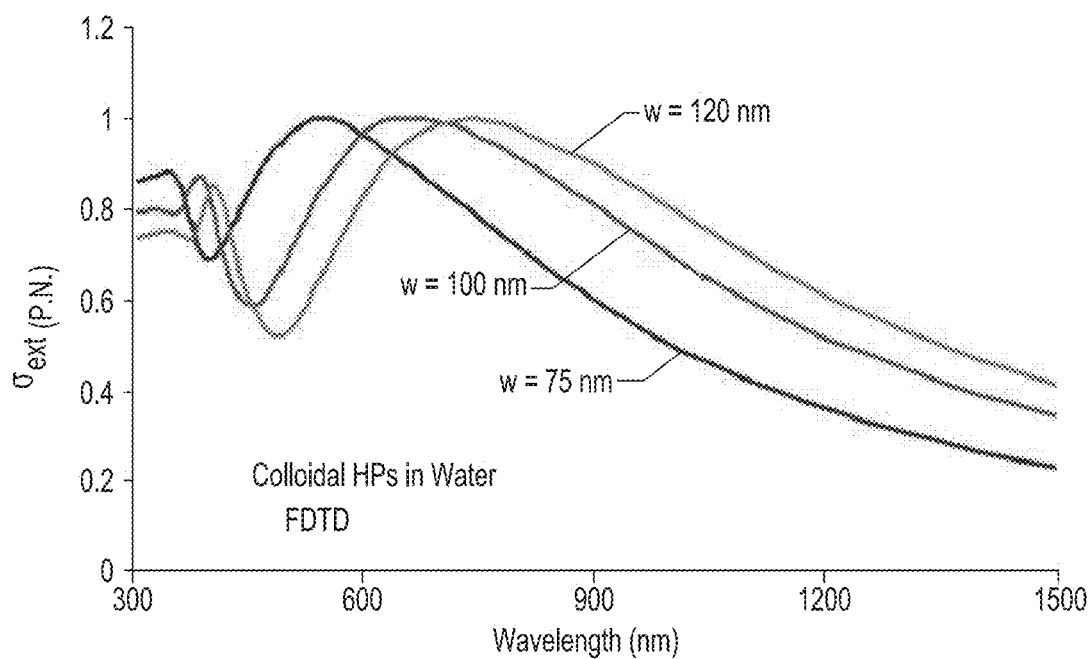

FIG. 34 shows a theoretical calculation of extinction cross-section ($\sigma_{ext}$) versus wavelength for colloidal hedgehog particles in water, where the hedgehog particles have nanospikes or needles with different widths, namely w=75 nm, w=100 nm, and w=120 nm.

Figure 35:
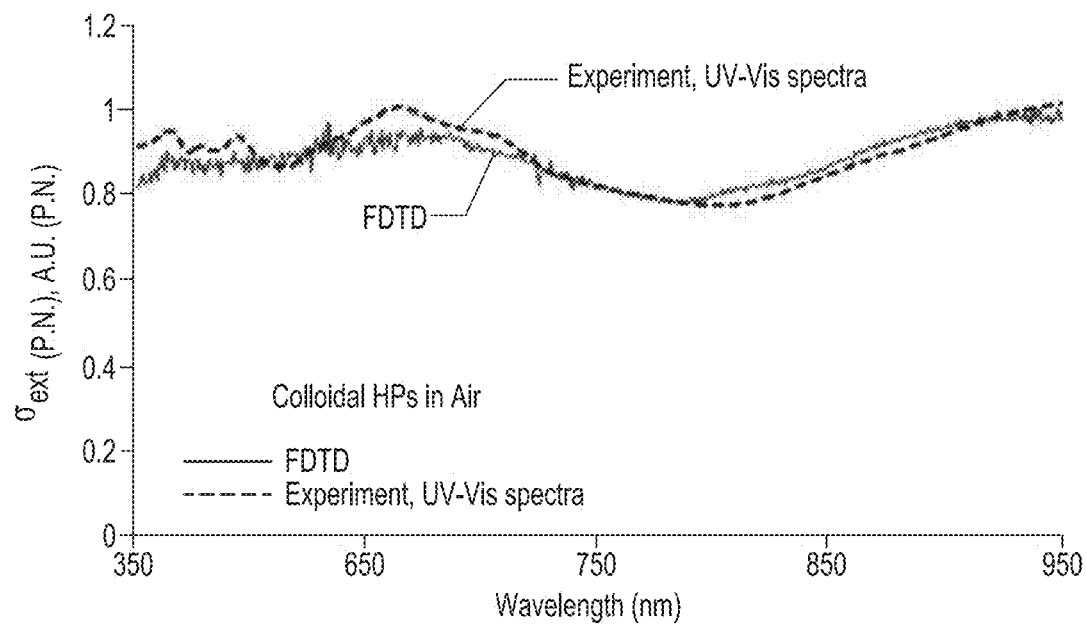

FIG. 35 shows a theoretical calculation of extinction cross-section ($\sigma_{ext}$) versus wavelength and experimental data for colloidal hedgehog particles in air.

Figure 36:
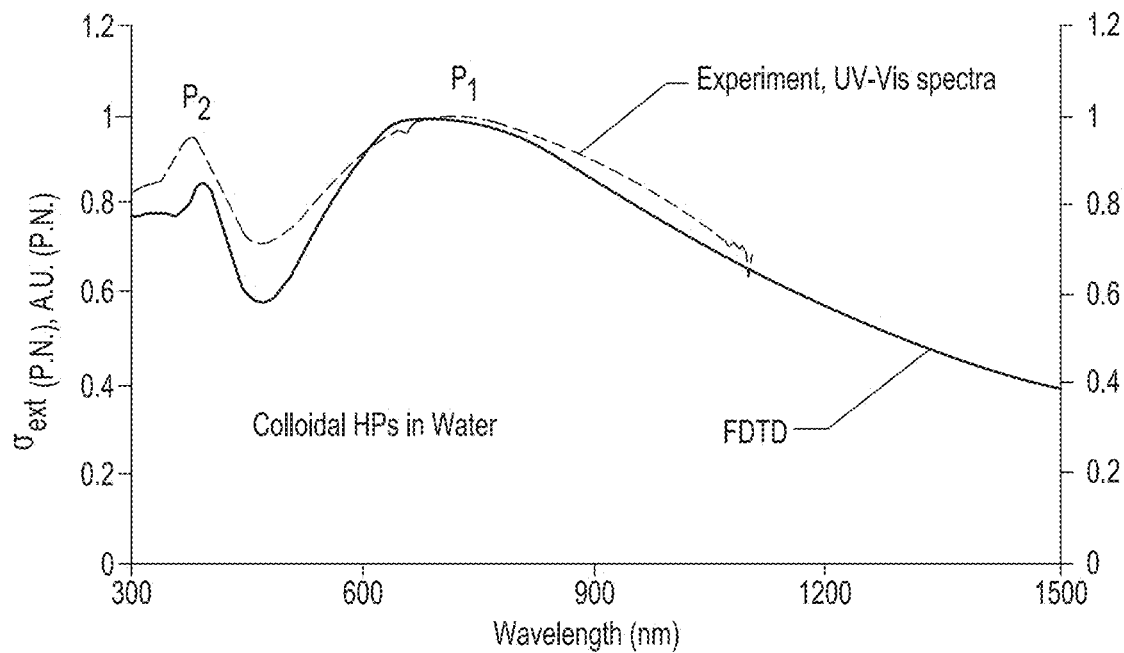

FIG. 36 shows a theoretical calculation of extinction cross-section ($\sigma_{ext}$) versus wavelength and experimental data for colloidal hedgehog particles in water.

Figure 37:
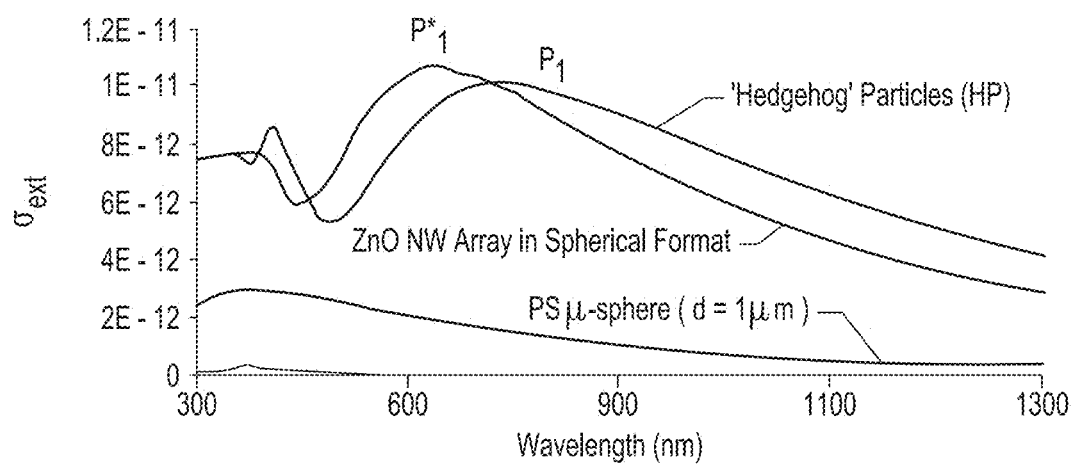

FIG. 37 shows extinction cross-section ($\sigma_{ext}$) versus wavelength for comparison, including a comparative PS μ-sphere particle, a ZnO nanowire array in a spherical format, and a hedgehog particle prepared in accordance with certain aspects of the present disclosure.

Figure 38A:
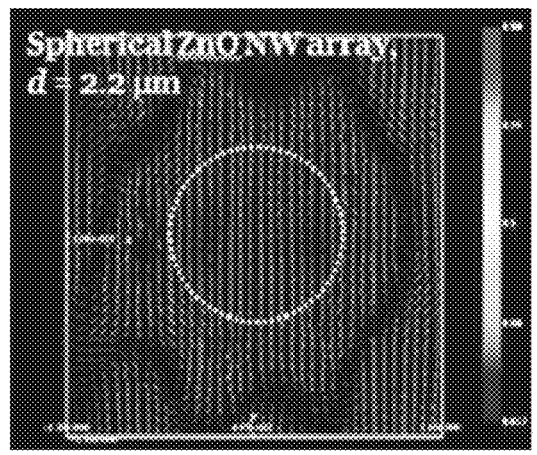
Figure 38B:
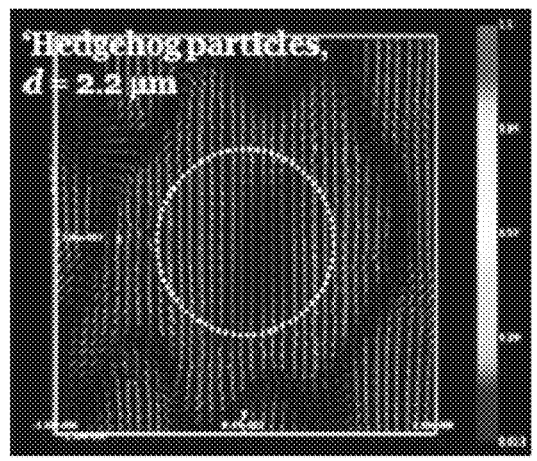

FIGS. 38A-38B. FIG. 38A shows a substrate dressing effect for a spherical ZnO nanowire array having a diameter of about 2.2 μm. FIG. 38B shows a substrate dressing effect for a hedgehog particle prepared in accordance with certain aspects of the present disclosure having a diameter of about 2.2 μm.

Figure 39:
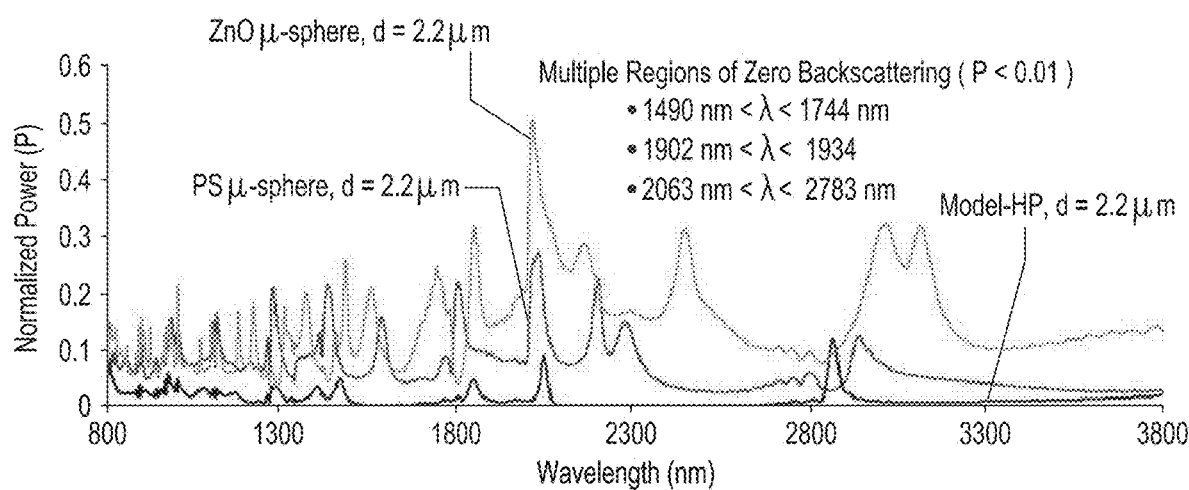

FIG. 39 shows multiple regions where backscattering (normalized power) is suppressed in comparing a PS μ-sphere particle, a ZnO μ-sphere particle, and a hedgehog particle (model HP) prepared in accordance with certain aspects of the present disclosure.

FIG. 40 shows multiple regions where forward scattering is enhanced by showing a ratio of forward scattering to back scattering (FB) for a PS μ-sphere particle, a ZnO μ-sphere particle, and a hedgehog particle prepared in accordance with certain aspects of the present disclosure.

FIGS. 41A-41B. FIGS. 41A-41B show a comparison of backscatter suppression for a PS μ-sphere particle and a hedgehog particle (HP) prepared in accordance with certain aspects of the present disclosure. E-field intensity and H-field intensity are shown for both particles in regions 1 and 2 corresponding to wavelengths of 2,423 nm and 1,575 nm.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of" the alternative embodiment excludes any additional compositions, materials, components, elements, features, integers, operations, and/or process steps, while in the case of "consisting essentially of" any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In various aspects, the present disclosure provides optical materials that incorporate hedgehog particles. Hedgehog particles may be microparticles or nanoparticles that generally emulate the shape of a hedgehog animal in that the particles have needles or spikes protruding from a central core region. Accordingly, hedgehog particles are multi-component particles with binary size regimes that comprise a micron-scale polymeric core on which needles or nanowires are sculpted orthogonal to the core surface. Hedgehog particles thus provide novel class of rough particles. As such, hedgehog particles display unexpected new opportunities for controlling light scattering in different media and thin films. A "microparticle" as used herein encompasses "nanoparticles," as discussed below. In certain variations of the present teachings, a microparticle component has at least one spatial dimension that is less than about 1,000 µm (i.e., 1 mm), optionally less than or equal to about 100 µm (i.e., 100,000 nm). The term "micro-sized" or "micrometer-sized" as used herein is generally understood by those of skill in the art to mean less than about 500 µm (i.e., 0.5 mm). As used herein, a microparticle has at least one spatial dimension that is less than about 10 µm (i.e., 10,000 nm), optionally less than about 5 µm (i.e., 5,000 nm), optionally less than about 1 µm (i.e., 1,000 nm), optionally less than about 0.5 µm (i.e., 500 nm), and in certain aspects less than or equal to about 0.1 µm (i.e., 100 nm).

The hedgehog particles may be "nano-sized" or "nanometer-sized" and have at least one spatial dimension that is less than about 1 µm (i.e., 1,000 nm), optionally less than about 0.5 µm (i.e., 500 nm), optionally less than about 0.4 µm (i.e., 400 nm), optionally less than about 0.3 µm (i.e., 300 nm), optionally less than about 0.2 µm (i.e., 200 nm), and in certain variations, optionally less than about 0.1 µm (i.e., 100 nm). Accordingly, a nanoparticle may have at least one spatial dimension that is greater than about 1 nm and less than about 1,000 nm (1 µm). In certain variations, a nanoparticle may have at least one spatial dimension of about 5 nm to about 500 nm. It should be noted that so long as at least one dimension of the nanoparticle falls within the above-described nano-sized scale (for example, diameter), one or more other axes may well exceed the nano-size (for example, length and/or width).

Generally, exemplary hedgehog particles are shown in FIGS. 1A-1L, 28, and 29. Hedgehog particles have a core region formed of a first material and a plurality of spikes or needles. The spikes or needles have an axial geometry and are anisotropic with an evident elongated longitudinal axis, which is longer than the other dimensions (e.g., diameter or width). Generally, an aspect ratio (AR) for cylindrical shapes (e.g., needle, spike, pillar, etc.) is defined as AR=L/D, where L is the length of the longest axis (here the major longitudinal axis) and D is the diameter of the needle or pillar. Suitable needles for use in the present technology generally have high aspect ratios, for example, ranging from at least about 100 to in excess of 1,000, for example. In yet other aspects, such needles may have an aspect ratio of 5,000.

The needles are connected to a surface of the core region. In various aspects, the needles are substantially orthogonal to a surface of the core region. By "substantially orthogonal," it is meant that a longitudinal axis of the needle may form an angle with respect to the core surface (where the needle is connected) having an angle of about 90° or another angle that slightly deviates from 90°, for example, deviates up to about 15° (e.g., from about 75° to about 105°).

In various aspects, a core region of the hedgehog particle is formed of a first material having a first refractive index. For the core region, optical properties depend on the material constitutive properties such as permittivity and permeability, which in turn determines refractive index. While there is no restriction on the first material, suitable examples of the first material for forming the core include polystyrene and silica ($SiO_2$). The refractive index of silica microspheres (e.g., about 1.37-1.45 at 589 nm) is similar to that of polystyrene (e.g., about 1.55-1.59). Hence there will not be a significant difference in the optical properties between the two materials.

Each respective core of the plurality may have an average diameter of greater than or equal to about 900 nm to less than or equal to about 5 µm, optionally greater than or equal to about 1 µm to less than or equal to about 3 µm, by way of non-limiting example.

In other aspects, the plurality of needles comprises a second material having a second refractive index. In certain aspects, the needles comprise zinc oxide as a second material. In alternative aspects, the needles may be formed of titanium dioxide or other metal oxides. Zinc oxide desirably provides organized growth orthogonalized on a substrate (here the surface of the core).

Each respective needle of the plurality may have an average length of greater than or equal to about 200 nm to less than or equal to about 750 nm. Longer needle lengths create electric dipole modes at higher wavelengths.

In certain other aspects, each needle of the plurality of needles may be coated with a third material. The optical properties can thus be further modified and controlled when each needle further comprises a third material coated over the second material. In certain aspects, the third material may be a nanoparticle or quantum dot. The third material may be a nanoparticle selected from the group consisting of: gold, silver, copper, nickel, iron, carbon, platinum, silicon, $TiO_2$, CdTe, CdSe, CdS, HgTe, HgSe, HgS, PbTe, PbSe, PbS, $MoS_2$, $FeS_2$, FeS, FeSe, and combinations thereof. By way of non-limiting example, in certain aspects, the third material may be selected from the group consisting of: coated titania ($TiO_2$), gold nanoparticles, silver nanoparticles, CdTe quantum dots, and combinations thereof.

In various aspects, the optical material incorporating optical hedgehog particles enhances forward scattering of a predetermined wavelength of light, while suppressing backscattering the predetermined wavelength of light. While scattering may generally encompass any redirection of incident radiation due to interactions with particles, in the optical materials described herein, light scattering is controlled and patterned by hedgehog particles with interfacial nano-scale geometry in the form of nano-spikes or needles. Scattering patterning provided in accordance with certain aspects of the present disclosure includes the suppression of resonant scattering, suppression of backscattering, and enhancement of forward scattering. Optical materials comprising one or more hedgehog particles preparing in accordance with the present disclosure can thus enable spectral tuning, meaning that the spectral line can be shaped in terms of a width of the peak, intensity of a peak and the wavelength location of the peak.

In certain aspects, electromagnetic waves or light of interest may include visible light having wavelengths ranging from about 390 to about 750 nm and infrared radiation (IR) (including near infrared (NIR) ranging from about 0.75 to about 1.4 µm; short wave infrared (SWIR) ranging from about 1.4 to about 3 µm; mid wave infrared (MWIR) ranging from about 3 to about 8 µm; long wave infrared (LWIR) ranging from about 8 to about 15 µm; and far infrared (FIR) ranging from about 15 µm to 1 mm). In certain aspects, a predetermined wavelength of light may include a range of light in the infrared range, more particularly in the near-infrared range of wavelengths.

In certain variations, the optical material is transparent, meaning that the optical material is transmissive for a target range of wavelengths of electromagnetic energy, for example, in the infrared wavelength ranges. Thus, in certain aspects, a transparent optical material transmits greater than or equal to about 60% of electromagnetic energy at the predetermined range of wavelengths, optionally of greater than or equal to about 65%, optionally greater than or equal to about 70%, optionally greater than or equal to about 75%, optionally greater than or equal to about 80%, optionally greater than or equal to about 85%, optionally greater than or equal to about 90%, and in certain preferred aspects, optionally greater than or equal to about 95% of the electromagnetic energy at the predetermined range of wavelengths (e.g., in the infrared ranges of the spectrum) is transmitted. The optical material may be designed to have select transparency windows where transmission through the optical material is high, while backscattering is low as described further below.

For example, in one variation, greater than or equal to about 65% of the predetermined wavelength of light directed at the optical material incorporated into an optical device is transmitted through the optical material when the predetermined wavelength ranges from greater than or equal to about 1,400 nm to less than or equal to about 1,600 nm, falling within the SWIR range.

In other aspects, greater than or equal to about 75% of the predetermined wavelength of light directed at the optical material is transmitted through the optical material, wherein the predetermined wavelength ranges from greater than or equal to about 800 nm to less than or equal to about 887 nm falling within the NIR range.

As will be described further below, the hedgehog particles can serve to suppress backscattering of light directed at the optical material for a predetermined range of wavelengths. By suppression of backscattering, it is meant that a significant portion of a predetermined range of wavelengths of electromagnetic energy, for example, in the infrared spectrum ranges, does not backscatter when directed at the optical material. Thus, in certain aspects, an optical material can be considered to suppress backscattering when less than or equal to about 25% of electromagnetic energy at the predetermined range of wavelengths, optionally less than or equal to about 20%, optionally less than or equal to about 15%, optionally less than or equal to about 10%, optionally less than or equal to about 5%, optionally less than or equal to about 3%, optionally less than or equal to about 2%, and in certain preferred aspects, optionally less than or equal to about 1% of the electromagnetic energy at the predetermined range of wavelengths (e.g., in the visible and/or infrared ranges of the spectrum) is backscattered when the electromagnetic radiation is directed at the optical material. Zero-backscattering is generally defined as a percentage of light reflected backward of less than about 1%.

In some variations, greater than or equal to about 99% of the predetermined wavelength(s) of light or electromagnetic radiation directed at the optical material is transmitted through the optical material and less than 1% of the predetermined wavelength of light backscatters.

In certain variations, the optical material has a transparency window in the telecommunication range of light, for example, wavelengths of about 1,400 nm to about 1,600 nm. In other variations, the optical material has a transparency window in the infrared range of light having wavelengths of about 0.75 µm to about 1 mm. In certain other variations, the optical material has a transparency window in the near infrared range of light, for example, wavelengths of about 800 nm to about 887 nm.

Thus, the optical materials comprising a plurality of hedgehog particles can provide controlled transparency, which depends upon the location of the predetermined wavelength(s) of electromagnetic radiation or light, a percentage of light that passes through the optical material, and a ratio between forward scattering and backward scattering. In certain aspects, the optical material has a ratio of forward scattering to backscattering of greater than or equal to about 200, for example, where the predetermined wavelength ranges from greater than or equal to about 1,236 nm to less than or equal to about 1,655 nm.

In one embodiment, the first material forming the core of the hedgehog particle is polystyrene and the second material forming the nano-needles/spikes comprises ZnO. High aspect ratio ZnO nanospikes or needles are constructed on the interface of the polystyrene sphere. The needles have a configuration whose long axis is normal to the sphere surface, as discussed above; the needles are substantially orthogonal to the sphere surface. The method of fabrication for such particles is shown in stages in FIG. 28 while the hedgehog particle is shown in FIGS. 1A-1L and 29

The HPs can be constructed by electrostatic adsorption of ZnO nanoparticles as seeds on carboxylated PS µ-spheres and subsequent growth of ZnO nanoneedles occurs through hydrothermal and sonochemical processes. The nano-topographical details, such as the length and thickness of the needles can be easily tailored to specifications by adjusting the growth conditions.

Such a geometrical configuration as is found in the hedgehog nanoparticle creates refractive anisotropy within the nano-topographical feature (from the sphere surface to the outer terminal end or tip of the ZnO nanoneedles in the spiky region) where the refractive index remains constant in the radial component of the spherical principle axis while discontinuities are present along the polar and azimuthal direction. Coupling of such structure with incident light permits excitation of only the lowest order of the electrical mode (only the electric dipole), while inhibiting excitation of rotational magnetic modes. Summarizing, such refractive anisotropy suppresses higher order electric modes (or permits only the electric dipole modes) and suppresses rotational magnetic modes at the spiky shell of hedgehog particles. Longer needle lengths will cause redshift in the spectral location of the electric dipole modes, resulting in its radiation at higher wavelengths.

In certain other aspects, hedgehog particles can be fabricated using a silica core. Due to lack of functional group, the silica particle may be treated to have a negative surface charge at the interface. A negative surface charge permits adsorption of positively charged ZnO nanoparticles, which functions as seeds for subsequent ZnO needle growth. This is done by coating the particle with positively charged polyelectrolyte followed by negatively charged polyelectrolyte in a layer-by-layer fashion.

In yet other aspects, hedgehog particles can be fabricated using a polystyrene core, where the surface is functionalized with carboxylate groups. A negative surface charge permits adsorption of positively charged ZnO nanoparticles, which functions as seeds for subsequent ZnO needle growth. This is done coating the particle with positively charged polyelectrolyte followed by negatively charged polyelectrolyte in a layer-by-layer fashion. Examples of suitable methods for forming hedgehog particles are further described in Bahng, J. et al., "Anomalous Dispersions of 'Hedgehog' Particles," Nature 517, pp. 596-599 (Jan. 29, 2015), the relevant portions of which are hereby incorporated by reference.

As noted above, in certain embodiments, the needles may be coated with a third material, such as a nanoparticle. To facilitate adsorption of such nanoparticles onto the ZnO needle, the ZnO surfaces of the needles can be treated to have a strong surface charge. First, entire hedgehog particles are coated with negatively charged polyelectrolyte, followed by coating with positively charged polyelectrolyte, in a layer-by-layer fashion. This process may be repeated several times. The terminating polymer layer is determined by the surface charge of the nanoparticle that will coat the ZnO needle.

Regarding selecting the size of the core, for example, a polystyrene core, due to its smooth geometry and refractive index isotropy throughout the particle, both electric and dipole modes are present. Where a particle size diameter of the core is increased, its size causes a redshift in the spectral location of the cavity modes (electric and magnetic modes). For example, radiation due to electric dipole modes and magnetic dipole modes will occur at higher wavelengths with increase in the polystyrene core sides.

In selecting the size of the hedgehog particles, due to two photonic compartments (microsphere core and the needles), superposition of electromagnetic modes due to individual compartments can be considered.

To control the transparence window, transparency will occur with significant suppression of back-scattering (near zero backscattering) and significant enhancement of forward scattering. Zero backscattering will occur at the first Kerker condition, that is, when the electric dipole modes and magnetic dipole modes are simultaneously present. Enhanced forward scattering will occur in a non-resonant scattering mode.

Thus, a size of the hedgehog particles can be increased by increasing either the diameter of the polymeric core or the length of the ZnO nano-spikes (or needles). Interfacial nano-topography offers excitation of only the electric dipole modes. Therefore, the size of the polystyrene sphere is chosen such that at a given wavelength, electric dipole modes due to ZnO needle in spherical array co-exist with magnetic dipole modes due to the polystyrene sphere. Hence, the transparency window is a function of the both the size parameter of the two photonic compartments (needles and the core) and they are not mutually independent.

The ZnO needle influences the electromagnetic modes in the core-sphere. The presence of the ZnO needles significantly suppresses resonant confinement of light within the core. The presence of higher refractive index ZnO needles cause refraction of light towards the ZnO needle away from the core and subsequent dissipation. This suppression of resonance enhances forward scattering.

Optical dependence on hedgehog particle sizes is as follows. Due to scaling invariance of the Maxwell's equation, the transparency window can be shifted to higher wavelengths (towards IR) by increasing the overall size of the hedgehog particles. The transparency window can be shifted to lower wavelengths (towards visible spectrum) by decreasing the overall size of the hedgehog particles Hedgehog particles may be easily dispersed in any environment (liquid dispersion, aerosol dispersion) and can be coated on any substrate to form a film. Thus, an optical material may include hedgehog particles dispersed in a media, such as in a liquid or gas, like air. In other variations, an optical material may be a film deposited on a substrate. A preferable composition of the substrate depends on optical device or target applications in which the optical material will be used. The optical material may thus be a film comprising the plurality of hedgehog particles. The film may comprise other material, as well, such as polymers and the like. In other variations, the optical material comprises the plurality of hedgehog particles dispersed or distributed in air.

Figure 3A:
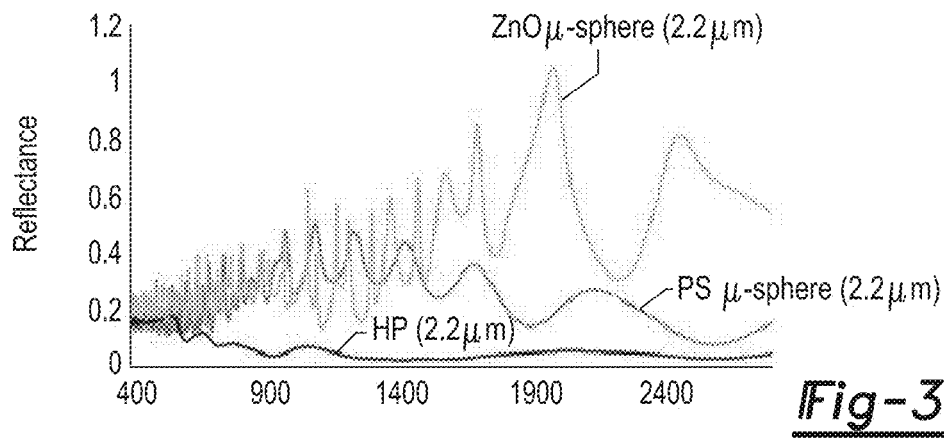
Figure 3B:
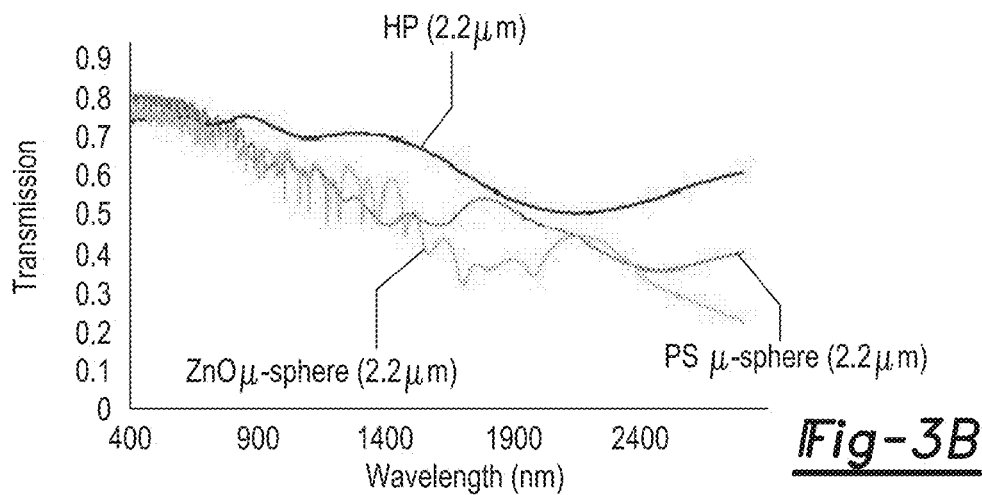
Figure 3C:
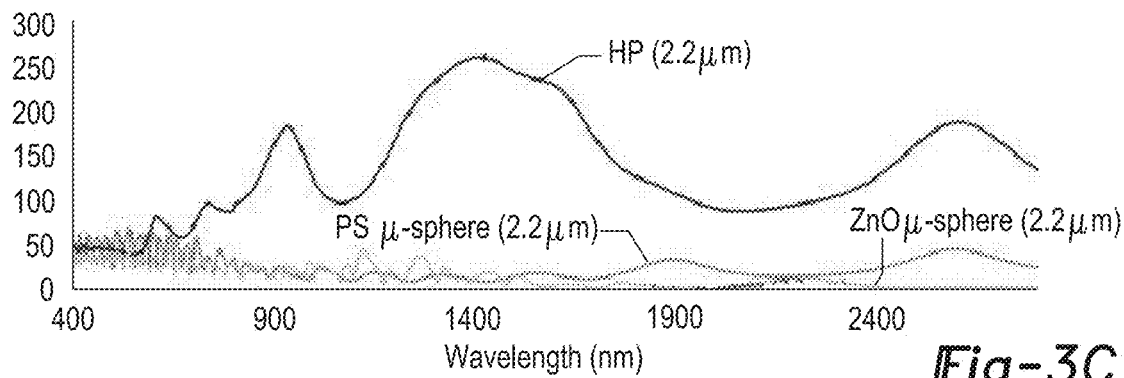

As shown in FIGS. 3A-3C, for a single hedgehog particle in air, zero backscattering occurs for a wavelength ($\lambda$) of greater than 700 nm. Transmission is high at the NIR range ($\lambda \sim 900$ nm) and at telecommunication range (1400 nm$<\lambda<$1600 nm).

Figure 4A:
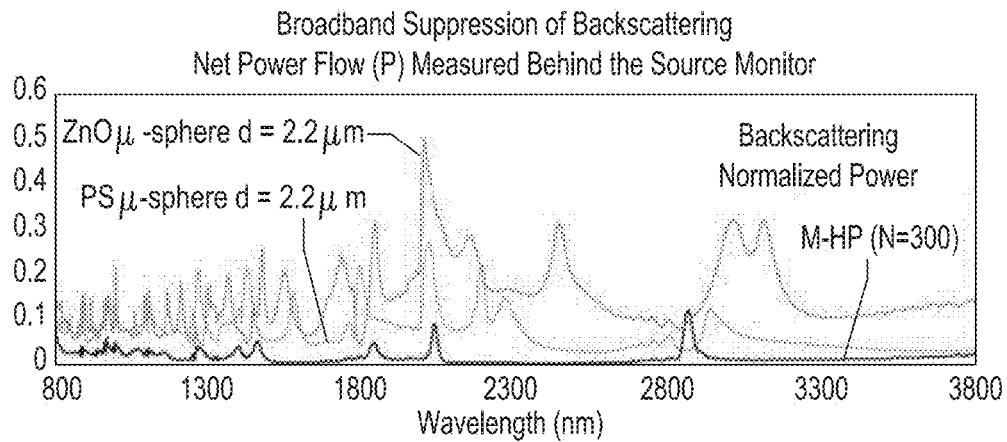
Figure 4B:
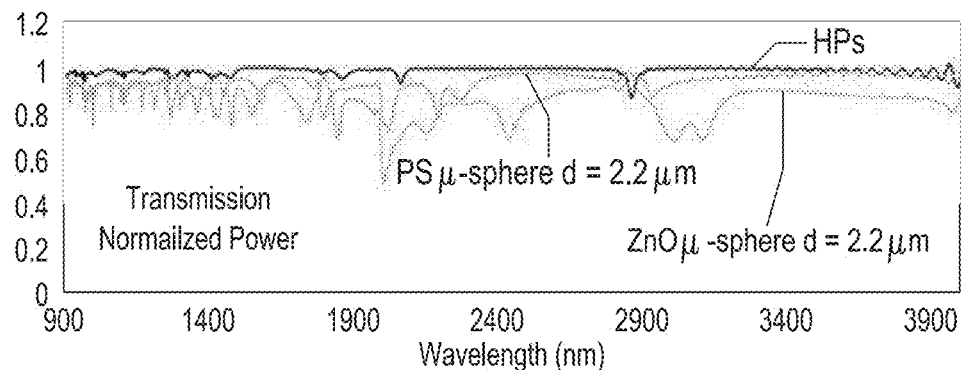
Figure 4C:
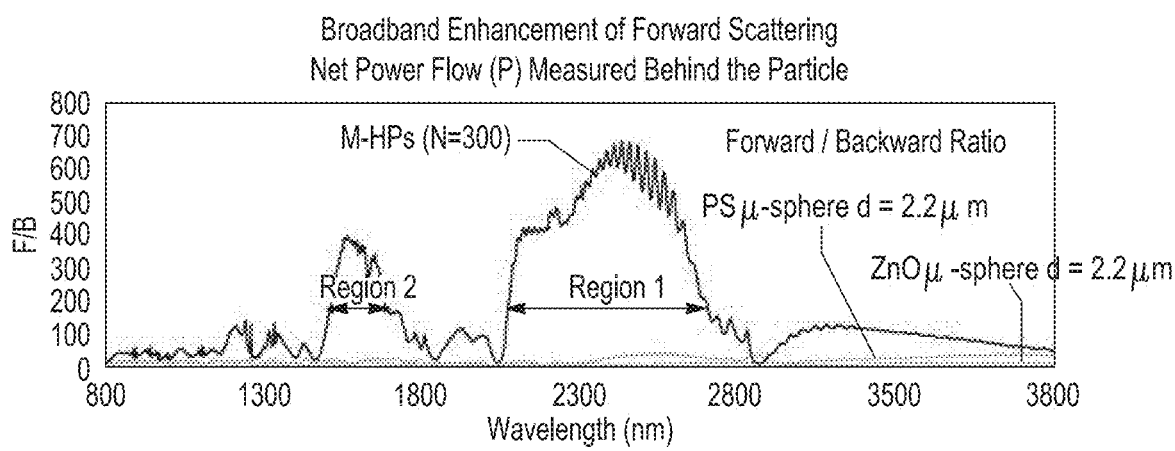

A collection of hedgehog particles in air is estimated as a flat array of particles in air. Here, the average distance between the hedgehog particles is set at 3.6 micrometers ($\mu$m). As shown in FIGS. 4A-4C, zero-back scattering occurs at 1490 nm$<\lambda<$1600 nm and at 2063 nm$<\lambda<$2783 nm. In another words, the zero-back scattering occurs at the telecommunication range and at mid-IR. Transmission is near unity in the regions of the zero-backscattering.

The difference in the spectra between a single hedgehog particle and an array of hedgehog particles in air is due to periodic Rayleigh anomalies (light diffraction due to periodic) structure. In this scenario, a narrower transparency window can be achieved at specific wavelengths.

There are two parameters that can be employed to achieve target transparency window (when confining materials to polystyrene microsphere and ZnO needles). The first is utilization of size of the hedgehog particles, while the other is utilization of diffraction pattern in an array of hedgehog particles.

In an embodiment with a single hedgehog particle in air, transmission of light is over 50% in all wavelengths. In the current configuration, transmission in the NIR is highest (>75%) at 800 nm$<\lambda<$887 nm. Light transmission exceeds 65% at the telecommunication range 1400 nm$<\lambda<$1600 nm. Forward to backscattering ratio exceeds 200 at 1236 nm$<\lambda<$1655 nm. The spectral location and the % of the transmission can be easily tuned with varying hedgehog particle sizes, as discussed above. In embodiments with an array with a plurality of hedgehog particles, near unity transmission (>99%) occurs in the regions of zero-backscattering.

Figure 5:
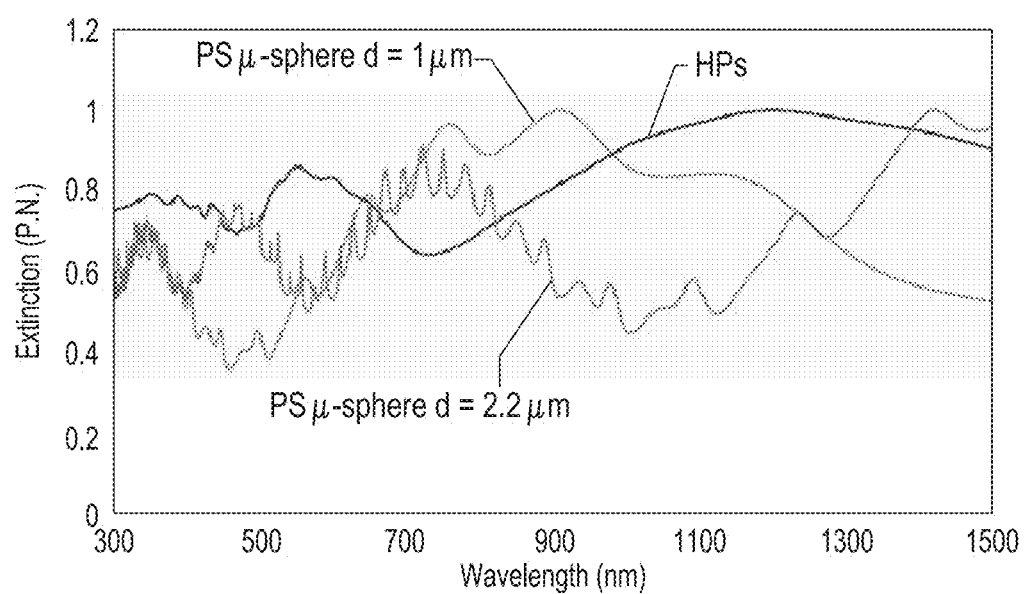

Physically, suppression of resonance refers to inability of matter to confine light and resonate (or oscillate, vibrate) within. Spectrally, resonant behavior can be identified by sharp ripples. Narrower the ripples and higher the oscillating amplitude, higher the resonance. Ripples are not visible in the light extinction spectra of the hedgehog particles, as shown in FIG. 5.

In various aspects, the present disclosure contemplates an optical device comprising an optical material comprising one or more microparticles or nanoparticles as described above, where each respective microparticle comprises a core region formed of a first material having a first refractive index and a plurality of needles connected to and substantially orthogonal to a surface of the core region having a second refractive index. The optical material enhances forward scattering of a predetermined wavelength of light, while suppressing backscattering the predetermined wavelength of light. The first refractive index is distinct from the second refractive index. In certain aspects, the first material has a first dielectric constant, while the second material has a second dielectric constant that is distinct from the first dielectric constant.

In certain aspects, low adhesion of hedgehog particles can create clouds with special optical properties. In other aspects, dispersions of hedgehog particles in air create clouds with concurrent enhancement of forward scattering and suppression of backscattering. These clouds can be used to obscure camouflage and obscure objects. Low back scattering can make them practically invisible. Further, the hedgehog particle clouds have complex propagation spectrum. They can obscure at one wavelength and be transparent at the other wavelength. The windows of transparency can be used to communicate through the cloud with recipient from the outside. The hedgehog particle layers can be used on optical devices as coatings. Hedgehog particle coating on solar cells can reduce parasitic reflectance and backscattering that reduces their efficiency. The layers of hedgehog particles can be deposited as a renewable layer that can be removed when needed. Additionally, the deposited optical hedgehog particles can also be hydrophobic and serve as a self-cleaning layer.

As further background, diverse optical components require scattering anisotropy. Sensitive to small perturbations in the "surface roughness" and environment, the hedgehog particles prepared according to certain aspects of the present disclosure provide compact and versatile platform to design electromagnetic responses. Previously, various far-field scattering and near-field patterning was achieved through plasmonic "rough" nano-scale particles within Rayleigh scattering regime.

All photonic components of the hedgehog particle are dielectric (Polystyrene core and ZnO nano-spikes/needles) and within Mie scattering regime ($d_{HP} \sim 2.2$ mm, $d_{PS\_core}=1$ mm, $h_{spike} \sim 0.6$ mm). Sensitive to even a small perturbation in its construct, the hedgehog particles according to certain aspects of the present disclosure provide versatile and compact platforms with which to design electromagnetic responses. With great advances in the nanofabrication, diverse particle types exhibiting unique and useful scattered radiation patterns are contemplated. In particular, hedgehog particles exhibiting broadband scattering with flexibility to suppress backscattering and enhance forward scattering can be used in a diverse array of photonic devices servicing photodetectors, antennas, and photovoltaics, by way of non-limiting example. The hedgehog particles have been found to have anomalous dispersion behavior that breaks the well-known "similarity rule." The hedgehog particles represent a novel class of "rough" particles comprised of all dielectric components that lies within the Mie scattering regime due to wavelength comparable dimensions.

Overall, hedgehog particles prepared in accordance with various aspects of the present disclosure can be used to control electromagnetic response of materials. It is possible to achieve enhancement of forward scattering while suppressing backscattering (e.g., reflection) with these hedgehog particles. In one aspect, the hedgehog particle's geometry of nano-spikes around a core creates a gradient in the refractive index. This focuses light in the forward direction and prevents back-propagation of light. The hedgehog particles appear to achieve two extinction peaks. A lower wavelength peak is somewhat narrow while the higher wavelength peak is broad. These peaks do not occur independently for zinc oxide nano-spikes or polystyrene micrsopheres. The geometry of the hedgehog particles results in the specific scattering behavior observed. Spectral tuning for the scattering can be achieved by changing the nanospike length or width. Such hedgehog particles thus provide the ability to control scattering for visible wavelengths as well as millimeter wave regions (e.g., infrared and microwaves). Furthermore, the hedgehog particles prepared in accordance with the present disclosure can be incorporated into other materials, such as thin films or other media.

The optical materials incorporating hedgehog particles may be used as obscurant clouds, scattering layers in optical devices, antireflective coatings, and the like. Various applications for optical hedgehog particle materials includes as obscurants, diffusers, bio-imaging, photovoltaics, optoelectronic devices, by way of non-limiting example. For example, an obscurant (or obscurant cloud) refers to the release of a vapor to avoid detection, for example, in military applications. Thus, the hedgehog particles prepared in accordance with certain aspects of the present disclosure can be used as obscurants, because they strongly suppress backscattering of electromagnetic radiation in the visible and infrared ranges. Obscurants can be used on military installations, vehicles, and vessels and may be deployed when a potential missile strike may occur. The blocking of radiation within the visible and infrared wavelengths hampers the ability of a missile to hit the target. An additional desirable feature is that transmission may be allowed for certain wavelengths, so that transmission of information from the target using a predetermined wavelength is not blocked by the obscurant cloud.

The hedgehog particles prepared in accordance with certain aspects of the present disclosure can be used in light scattering layers. For example, in one application, a light scattering layer may be used in an organic light emitting diode (OLED) display, where an organic LED is used as a light source. The LED light source allows for fast switching, so OLEDs can achieve a true black color by simply turning off the light in a select region. OLED displays contain a scattering layer to help control the transmission of light. One issue faced by OLEDs is that they are prone to water damage. If the hedgehog-particle containing film is used as a light scattering layer, it can also be used for its hydrophobic properties (thus forming a dual function layer of that provides light scattering and hydrophobicity) to help protect the OLED.

Further, light scattering layers can be used to make LED lighting feel more natural, like ambient light. When light from the sun travels through the atmosphere, it's subjected to Rayleigh scattering, where the path that light travels within is affected by particles in the atmosphere. Rayleigh scattering is a limiting case of Mie scattering, which can describe how light scatters when interacting with a particle. Mie scattering can be used to describe light interacting with particles having a size comparable to the light's wavelength. Thus, light perceived as natural is subject to random scattering. As such, the use of a scattering layer comprising hedgehog particles prepared in accordance with certain aspects of the present disclosure can be used to improve light emitted from a LED source to seem more natural.

Another application for hedgehog particles prepared in accordance with certain aspects of the present disclosure is to improve solar cell efficiency. This can be achieved by improving the efficiency of solar cells, by making light travel a further or longer path, while it is in the photovoltaic cell. Light can travel a longer path if it scatters at an oblique angle as it enters the solar or photovoltaic cell. The incorporation of light scattering materials, for example, comprising hedgehog particles, into a photovoltaic solar cell can thus improve solar cell efficiency.

Thus, the optical devices as described herein may incorporate the optical material comprising one of more hedgehog particles for improved performance and may include optoelectronic devices, photovoltaic cells, photonic devices (e.g., servicing photodetectors), antennas, and the like. In this manner, the optical materials provide advantages including: transparency bands in telecommunication wavelengths, spectral tenability of transparency windows by altering the length of the needles on the hedgehog particles, low adhesion with one another, and the ability to form renewable coatings.

As described herein, hedgehog particles prepared in accordance with certain aspects of the present disclosure feature broadband light scattering in conjunction with broadband suppression of backscattering and enhanced transmission. Such far-field pattern stems from the presence of spiky needle interfaces that significantly suppress resonant behavior within the particle and reshape the near-field profile in the form of simultaneous excitation of electric and magnetic fundamental modes. Addition to a library of electromagnetic responses of diverse particle types is also contemplated, which will provide optical materials that can be used in variety of optical devices, including in photonic devices.

Figure 1A:
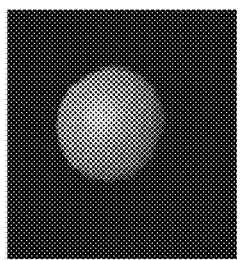
Figure 1B:
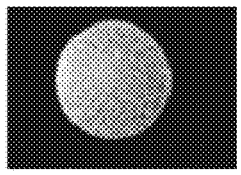
Figure 1C:
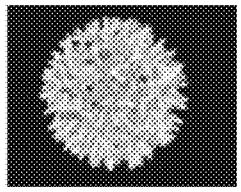
Figure 1D:
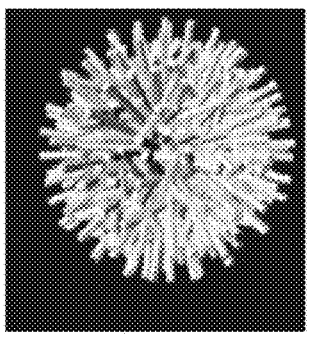
Figure 1E:
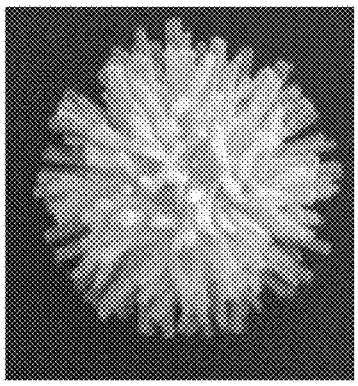
Figure 1F:
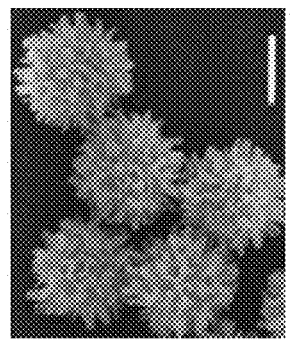
Figure 1G:
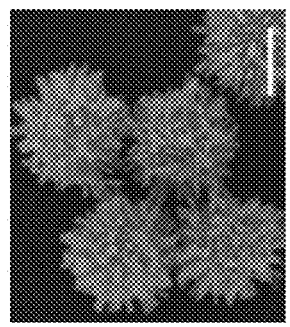
Figure 1H:
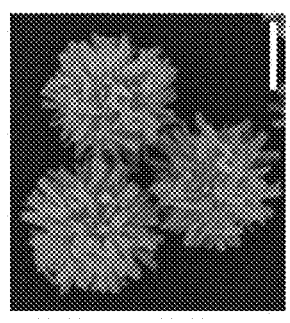
Figure 1I:
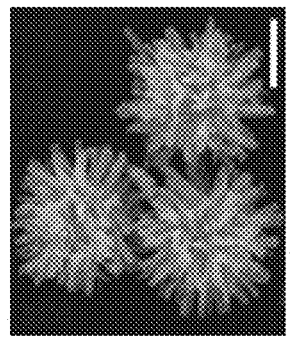
Figure 1J:
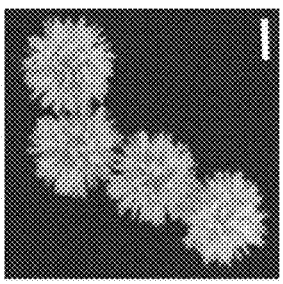
Figure 1K:
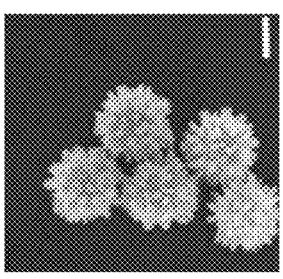
Figure 1L:
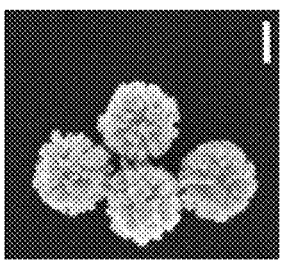
Figure 2A:
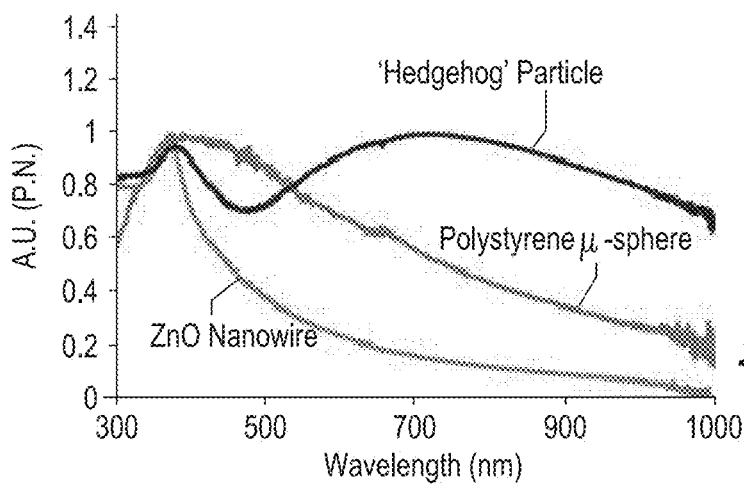
Figure 2B:
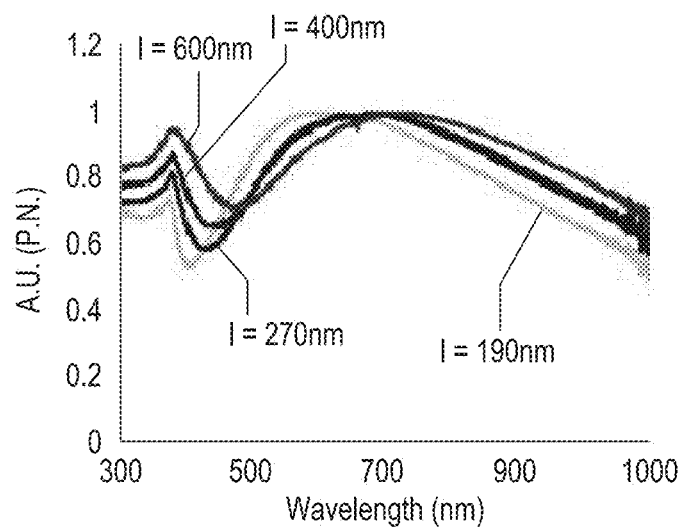
Figure 2C:
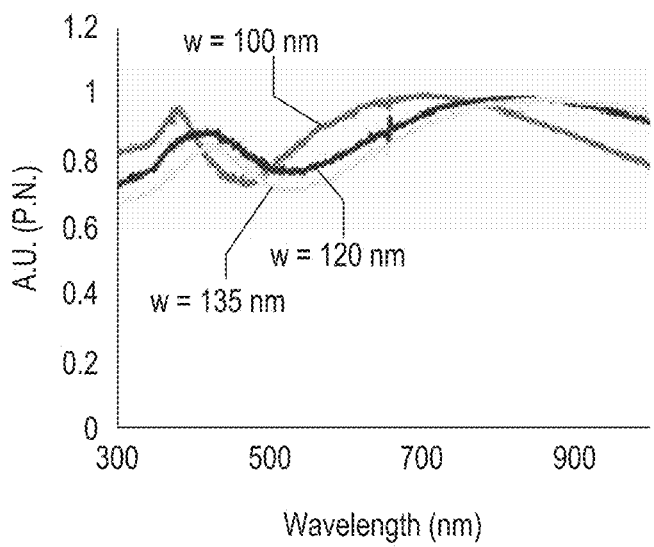

The hedgehog particle (HP) is theorized to be an efficient broadband light scatterer due to embodiments of multiple electromagnetic interferences at the spiky needle interface. As shown in FIGS. 2A-2C, unlike typical smooth and low refractive index dielectric micro-particles, the HPs exhibit atypical extinction features with two peaks, notably one broadband peak at ~730 nm ($P_1$) and another narrower peak at ~405 nm ($P_2$) and does not correlate with the extinction features of either comparative ZnO nanowire spheres or PS μ-spheres. It should be noted that peak normalized (P.N.) spectra discussed herein focuses on the spectral line shape rather than the scattering intensities and efficiencies. Spectral tuning is easily achieved by adjusting its corrugation geometry. Increasing the ZnO nanospike/needle length (l) causes spectral redshift and broadening of both of the peaks. A similar trend is observed with increase in the nanospike width (w).

Figure 6A:
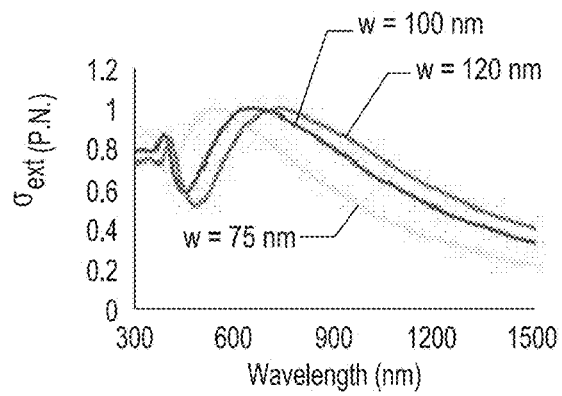
Figure 6B:
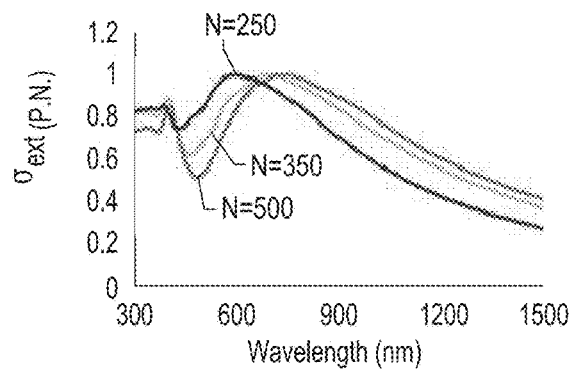
Figure 6C:
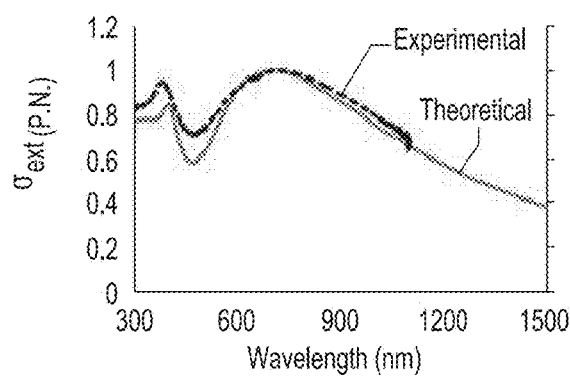
Figure 14A:
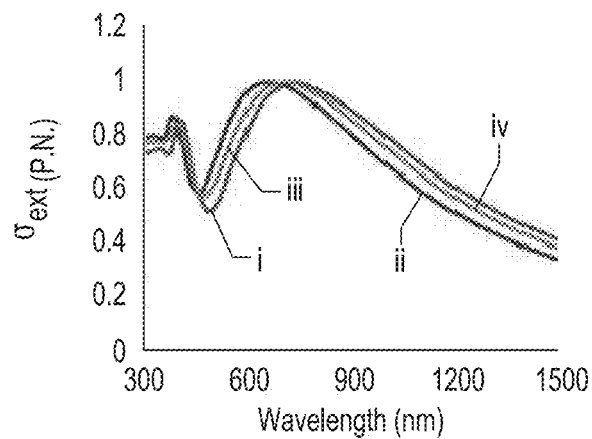
Figure 14B:
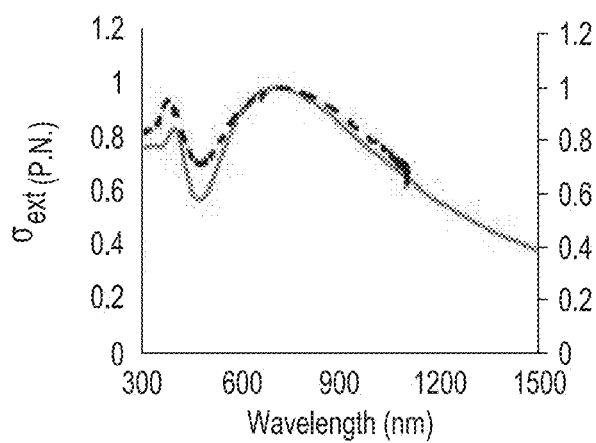
Figure 15:
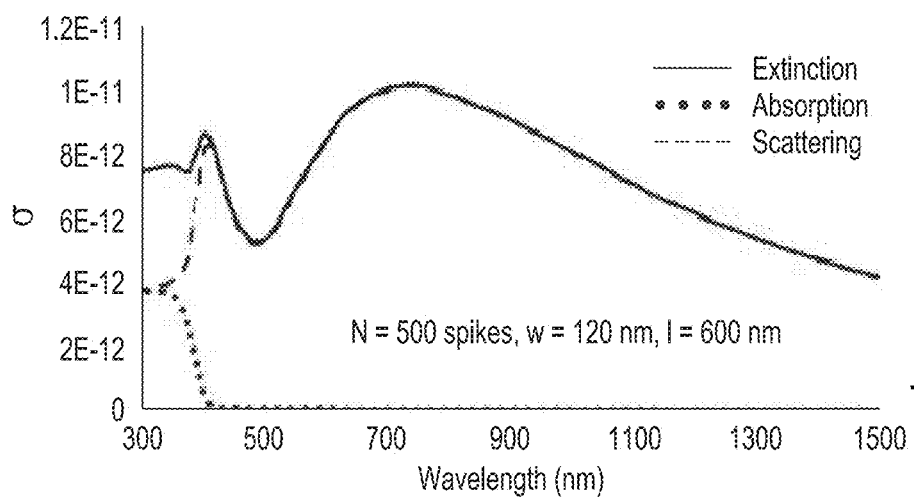
Figure 16A:
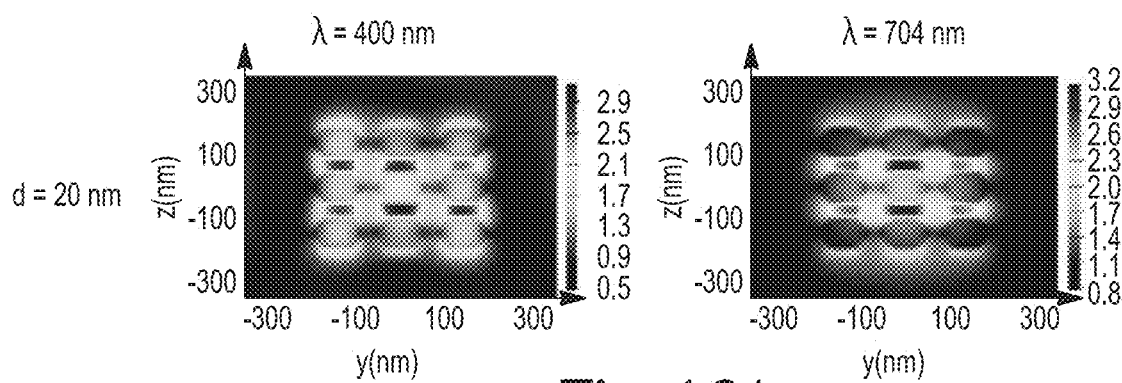
Figure 16B:
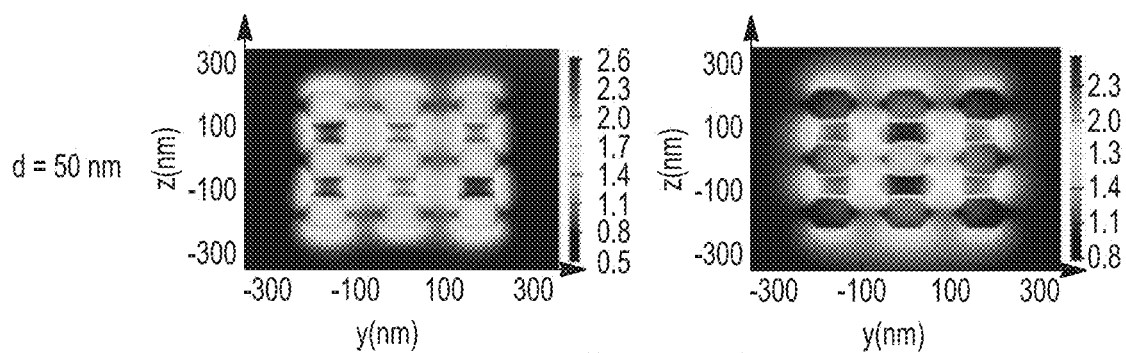
Figure 16C:
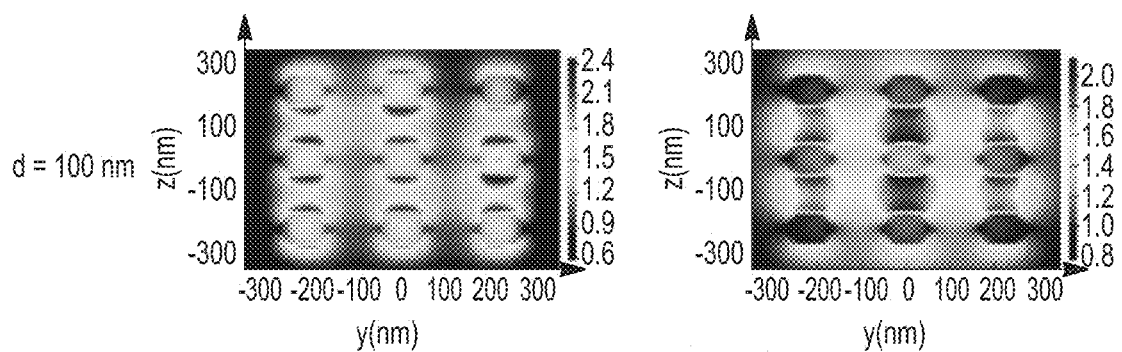
Figure 16D:
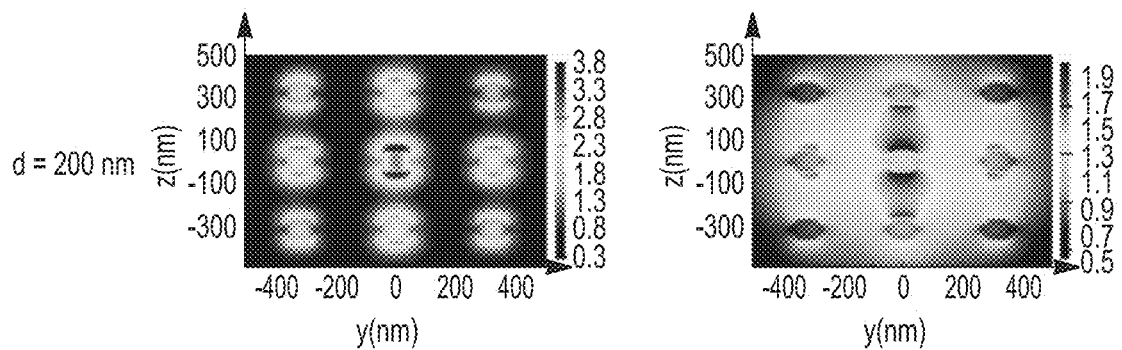
Figure 16E:
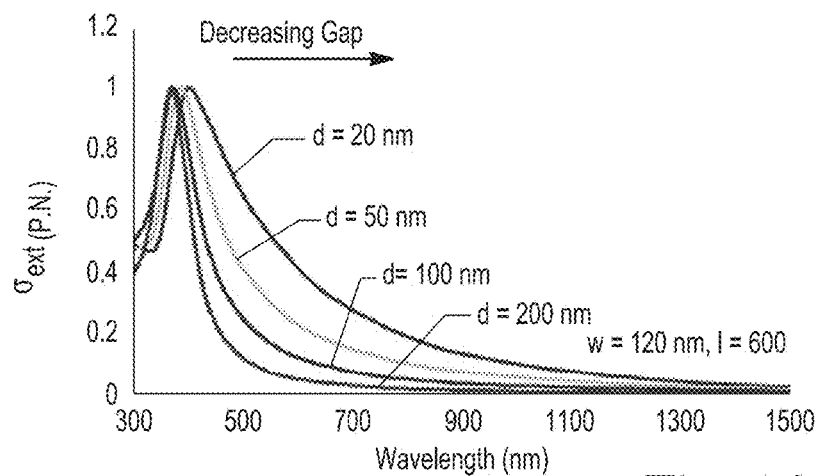
Figure 17A:
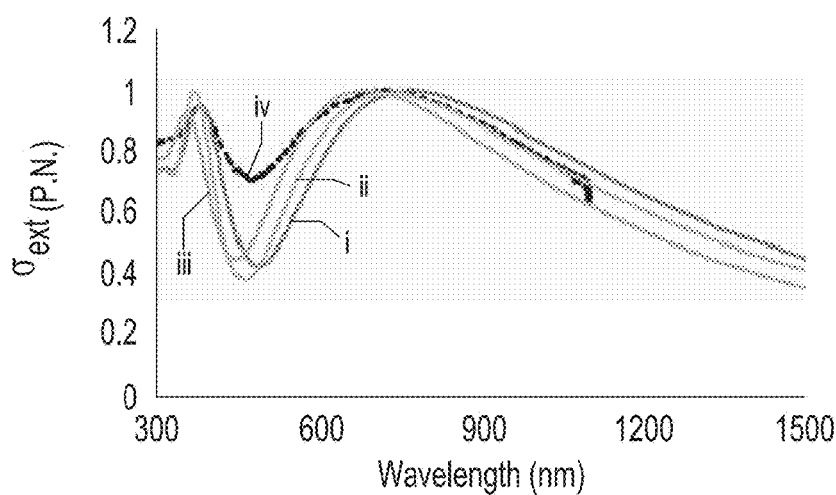
Figure 17B:
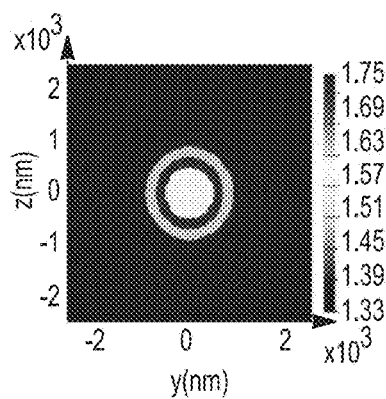
Figure 17C:
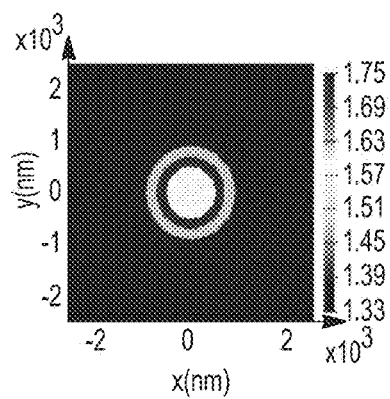
Figure 17D:
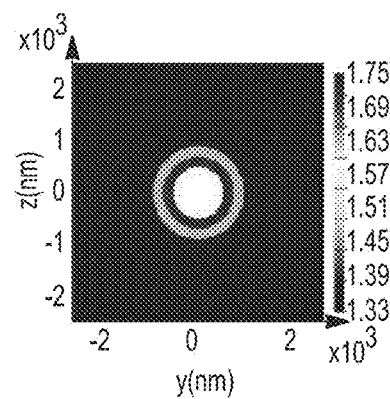

The uncharacteristic broadband peak $P_1$ that spans from the visible to the NIR range suggests electromagnetic coupling between the structural components within the HPs. Due to its high aspect ratio nano-topography, analytical Mie theory is not adequate to representatively compute the EM responses. Here, a finite difference time domain (FDTD) method has been employed as its approach is suitable to handle optical properties of geometrically complex particles. Model HP (M-HP) is reconstructed to mirror imperfect orthogonalization of ZnO nanoneedles/nanospikes to reflect the experimental construct (FIG. 13). The FDTD based simulations (Lumerical FDTD Solutions) of extinction cross-section ($\sigma_{ext}$) by the M-HP illuminated with total field/scattered field (TFSF) plane wave approximates the spectral line-shape of spectroscopic measurement with excellent agreement (FIGS. 6C and 14A-14B). The FDTD simulation based on the M-HP also captures spike width dependent peak-shifts and additionally shows expected red-shift with increase in the needle density (FIGS. 6A-6B). As expected, the overall $\sigma_{ext}$ of a HP is scattering dominant due to nonabsorbing dielectric components (FIG. 15).

Figure 6D:
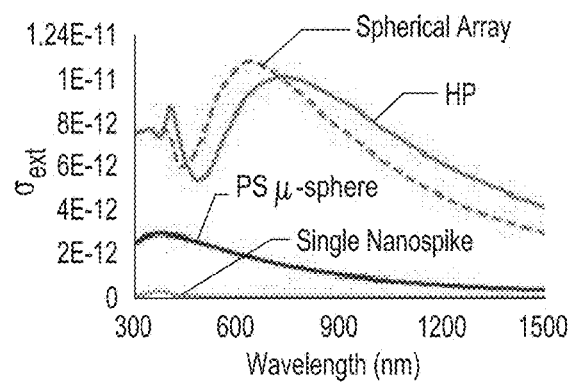
Figures 6E, 6F:
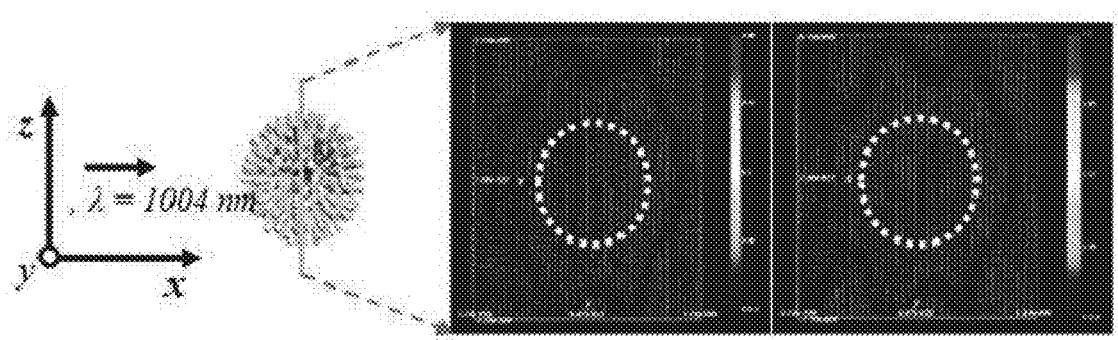

The lack of spectral correlation between the HP and its components (FIGS. 2A-2C) suggest that the origin of $P_1$ points to particle architecture. Indeed, evolution of $\sigma_{ext}$ from a PS µ-sphere and a ZnO nanospike/needle to the M-HP construct shows that the ortho-spherical arrangement of ZnO needles is the governing structural attribute that generates $P_2$ (FIG. 6D). In the presence of PS µ-sphere, linearly polarized plane wave irradiation (polarized in the z-direction, propagating along x-direction, $\lambda=1004$ nm) shows redistribution of electric field (E-field) vector profile that spatially extends to the core. The presence of the PS µ-sphere increases the polarizability within the HP and induces electric field coupling with the core substrate, reminiscent of the "dressing" effect. Such leads to a further spectral redshift of the $\sigma_{ext}$ line-shape (FIGS. 6E-6F).

It should be noted that the M-HP requires higher nanospike/needle densities (N) to spectrally match with the experimental construct ($N_{experiment}$~200-250, $N_{M-HP}=500$). This may be due to large mesh size employed in the FDTD simulations to remain within the computational budget; this may not sufficiently grasp the geometrical finesse and complexities at the interfacial corrugation. Hence, simplifying the empirical HP features to appropriate core-shell representation should yield extinction line-shape accordant with spectroscopic measurements.

Due to orthogonalization of needles in spherical format, the spiky needle volume of the HP is remodeled with gradient refractive index via three discretized shells at 1:1:1 or 3:2:1 (outer:middle:inner shell) thickness ratios, layered on the PS µ-sphere. Refractive indices of each shell are designated by effective medium approximation (EMA) using Maxwell Garnett mixing rule for two-phase heterogeneous media. The triple-shell model representative of HPs having $N_{3\text{-}shell}=250$~275 indeed shows extinction pattern with excellent agreement with the far-field experimental data (FIGS. 17A-17D and 18A-18D).

Figure 7A:
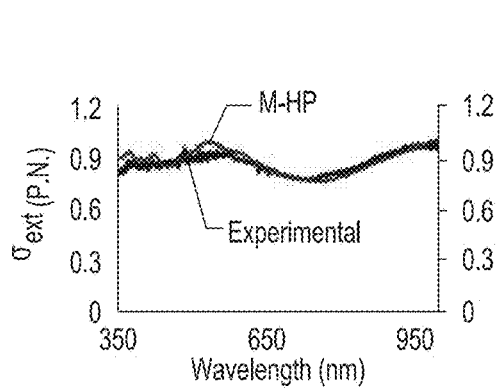
Figure 7B:
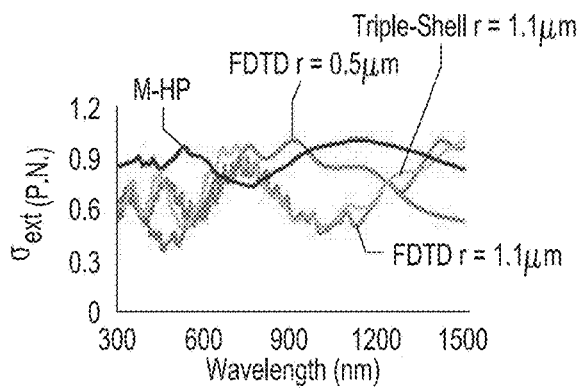
Figure 7C:
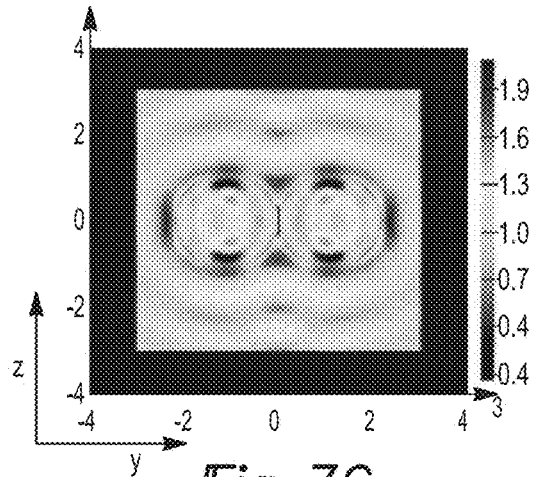
Figure 7D:
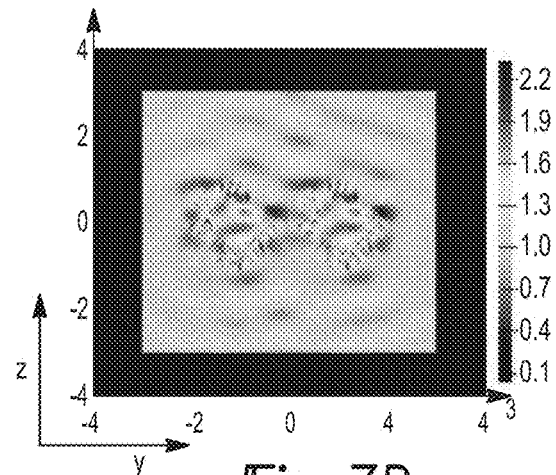

Triple-shell models with analytically smooth surfaces and EMA derived constitutive properties, however, are unable to accurately account for the near-field profiles. This is more evident in air representing higher refractive index contrast. First, excellent agreement in the farfield pattern is achieved with the M-HP and the experimental construct suspended in mid-air, to prevent the "dressing" effect with surfaces (FIGS. 7A-7D). FDTD simulations of a PS µ-sphere of equivalent diameter to the HP in air exhibits resonant behavior, which eventually dissipates due to leaky nature of the low refractive index material. The resonant behavior is also seen in the far-field extinction data where ripples of sharp peaks are observed within the coarse oscillation (FIG. 7B). The gradient refractive index triple-shell model also exhibits resonant behavior, but at much lower Q-factor (FIG. 7B). Meanwhile, the resonant feature is significantly suppressed in the lower wavelengths and non-existent at $\lambda>650$ nm for the M-HP (FIG. 7B). Here, it appears that the light undergoes, not completely but close to, a non-resonant form of Mie scattering.

Despite the constitutive properties and size ranges that predicts resonance from the Mie theory; the suppression of resonance is believed to be due to the inability of the core cavity to efficiently confine light due to its refraction towards optically more dense nanoneedles, followed by the radiative decay.

Figure 20A:
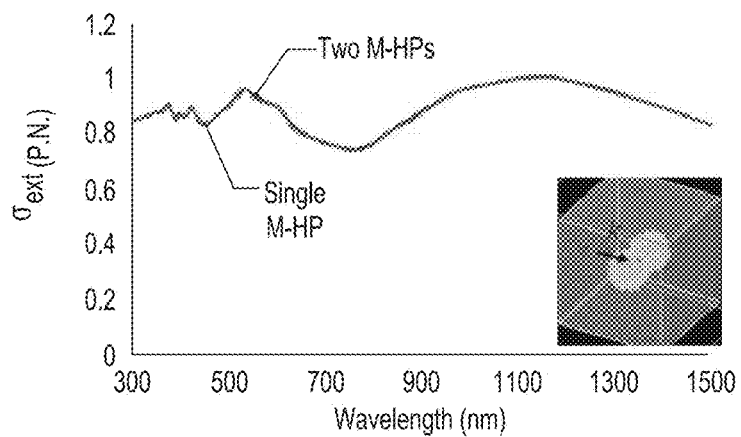
Figure 20B:
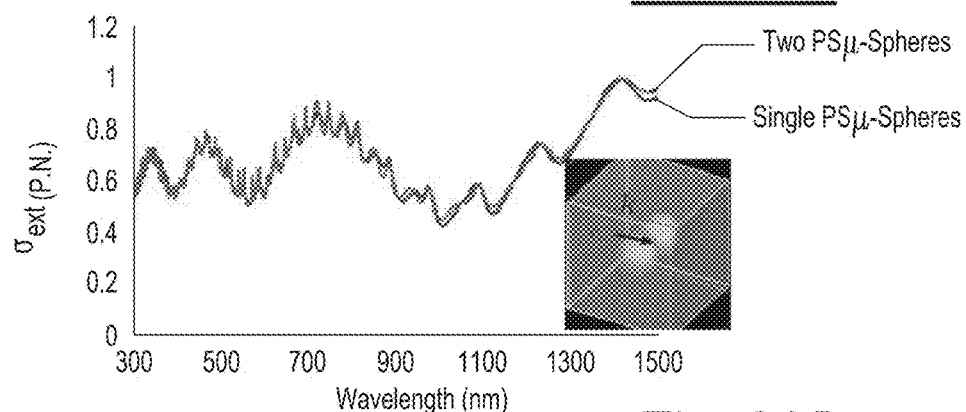
Figure 21A:
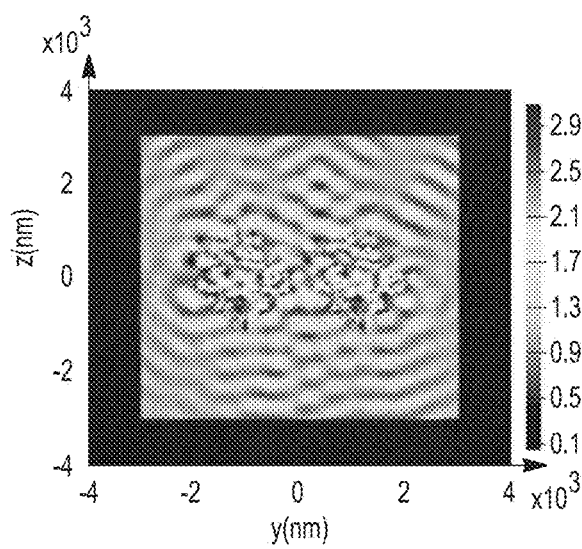
Figure 21B:
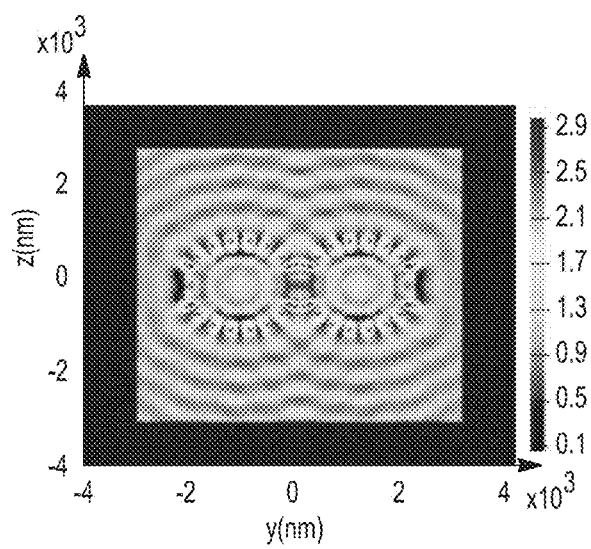

The non-resonant form of scattering is further verified by coupling free effect at the nearfields (FIGS. 7C-7D and 21A-21B) and by spectral overlap of $\sigma_{ext}$ between a single M-HP and a pair of M-HPS with zero separation distance aligned perpendicular to the incident plane wave (FIGS. 20A-20B). As described further below, the non-resonant form of scattering, characterized by explicit forward directionality and previously achieved with all polymer core-shell nanowires, plays an important role in shaping the scattering pattern by the HPs.

Figure 8A:
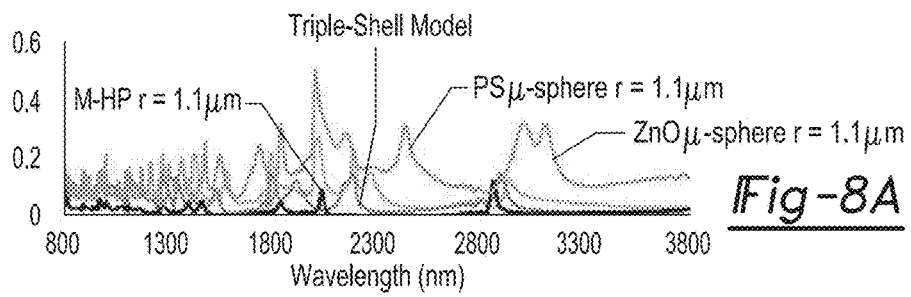
Figure 8B:
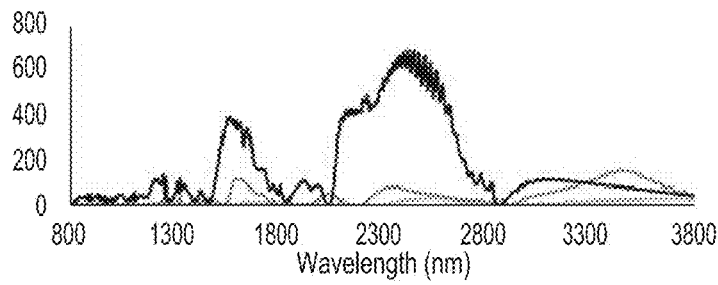
Figure 8C:
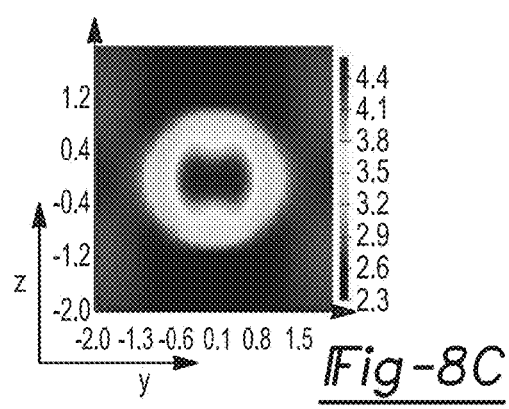
Figure 8D:
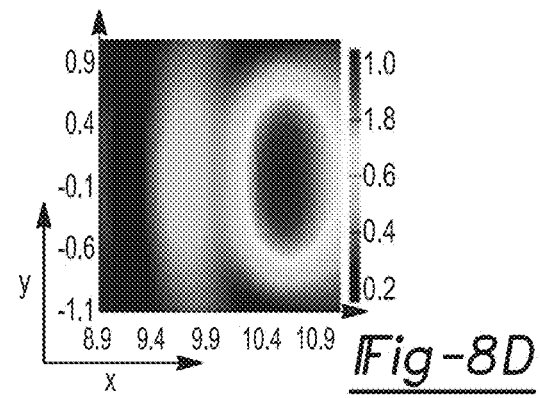
Figure 8E:
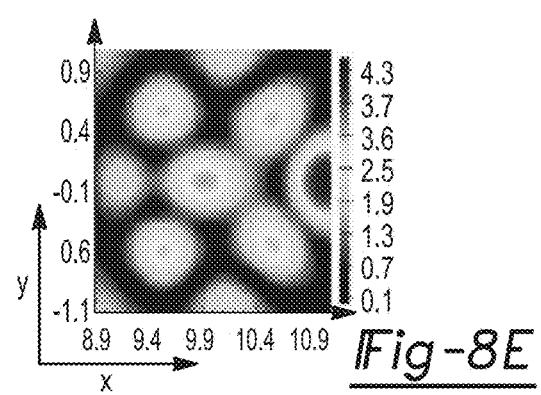
Figure 8F:
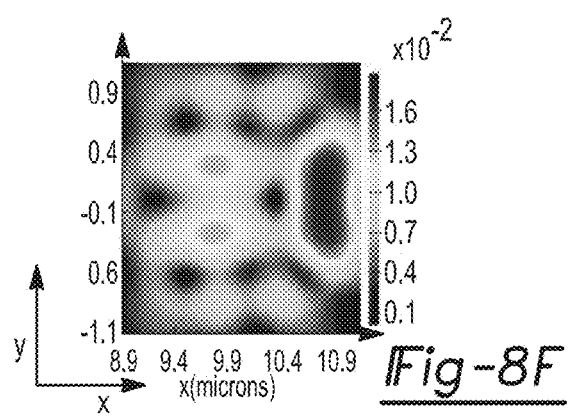

It is observed that owing to the spiky interface, that M-HP exhibits significant suppression of resonant behavior. The FDTD-based simulation also shows a very useful scattering anisotropy in the form of suppression of backscattering. The M-HP exhibits broadband suppression of backscattering, and there are multiple regions (1490 nm<$\lambda$<1744 nm, 1490 nm<$\lambda$<1744 nm, 1490 nm<$\lambda$<1744 nm) where zero-backscattering occurs (P<0.01) (FIGS. 8A-8J). Zero backscattering is defined as percentage of normalized power collected at a monitor located behind the radiation source that is less than 1% (FIGS. 22A-22B). At the same time, enhancement of forward scattering occurs at the spectral vicinity of zero backscattering, aided by the forward directionality of the overall scattering pattern due to suppression of resonance. There are multiple regions where forward to backward scattering ratio (F/B) exceeds 200, 2075 nm<$\lambda$<2690 nm denoted as Region 1 and 1509 nm<$\lambda$<1674 nm denoted as Region 2 (FIG. 8B). The maximum F/B reaches as high as 680, at $\lambda=2423$ nm. It should be noted that in the previous studies that demonstrated broadband suppression of backscattering and enhancement of forward scattering, the spectral range was limited to ~70 nm, with F/B~3. F/B~8 was achieved with silicon nanoparticles.

The mechanism behind such scattering anisotropy could be elucidated with the near-field profiles within the particle. First looking at Region 1 where F/B>200, magnetic dipole (MD) mode is excited within a PS µ-sphere of r=0.5 representing the core of the HP, when illuminated with a plane wave of $\lambda=2423$ nm (FIGS. 23A-23B). FIGS. 23A-23B show enhanced forward scattering by model HP in air.

Figure 8G:
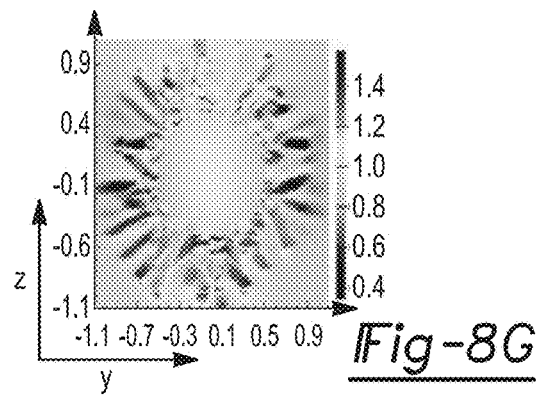
Figure 8H:
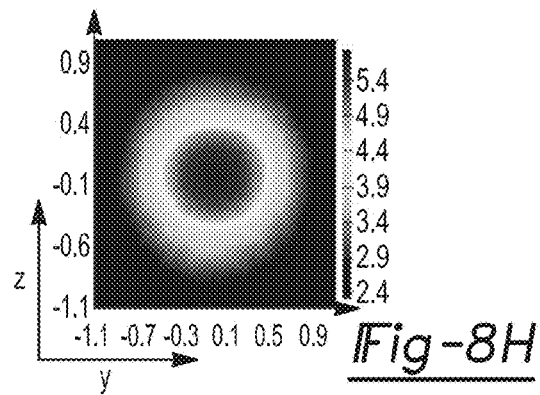
Figure 8I:
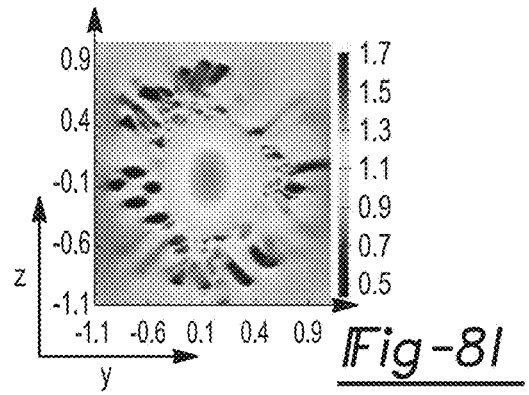
Figure 8J:
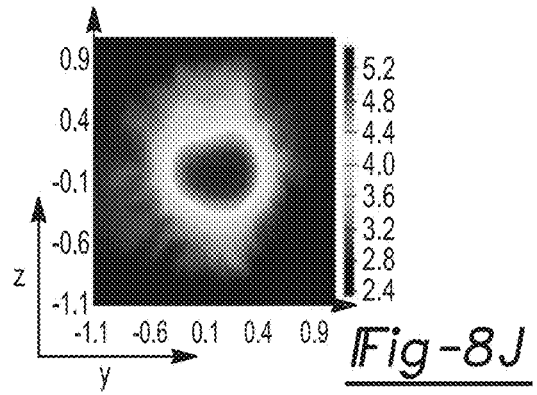
Figure 9A:
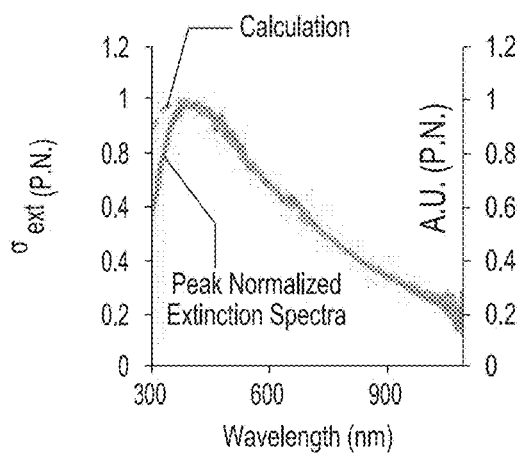
Figure 9B:
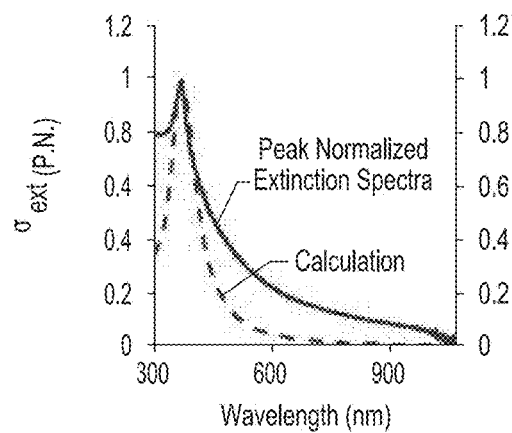
Figure 10A:
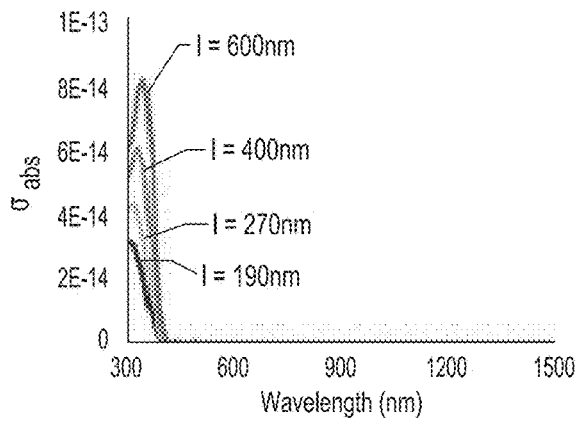
Figure 10B:
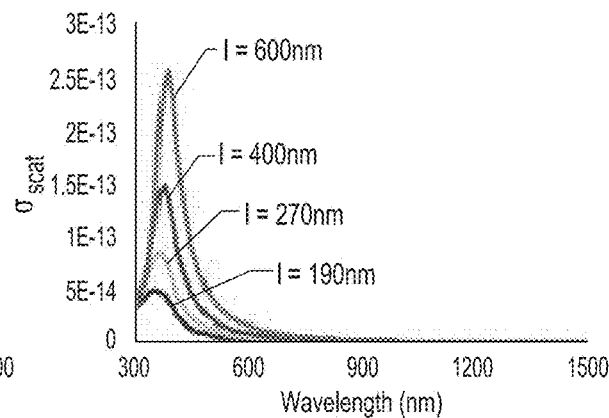
Figure 10C:
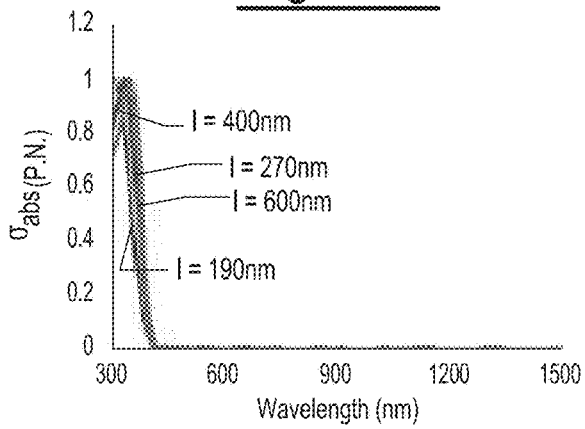
Figure 10D:
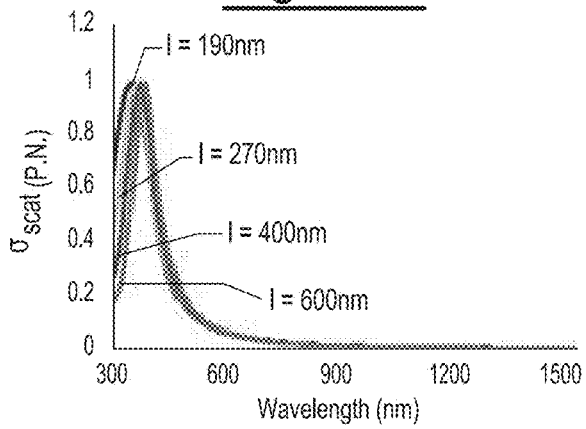
Figure 11A:
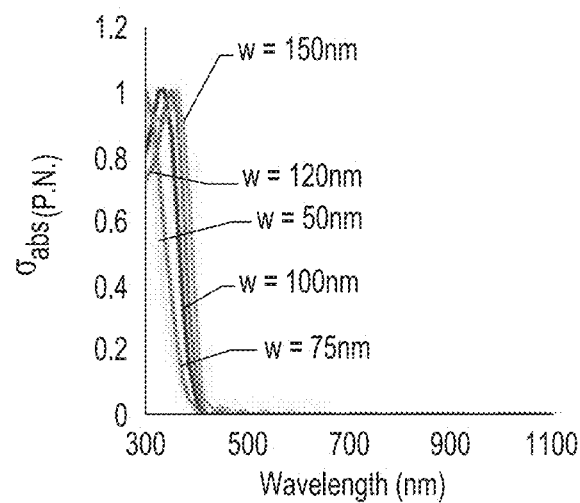
Figure 11B:
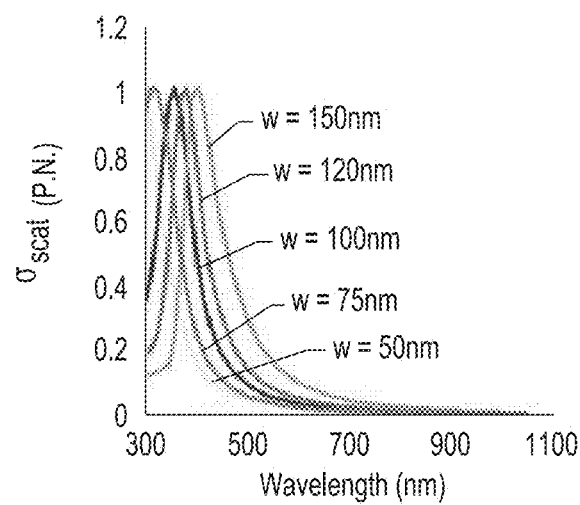
Figure 11C:
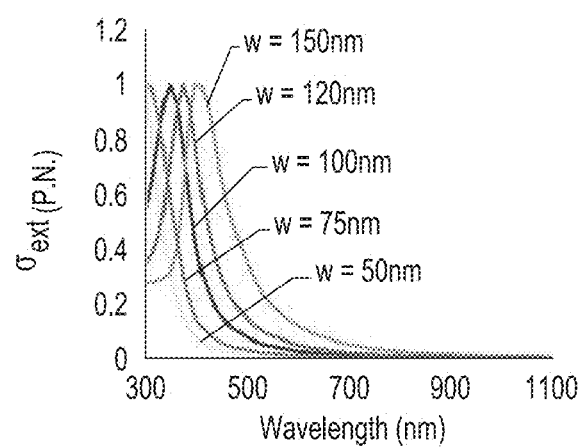
Figure 25A:
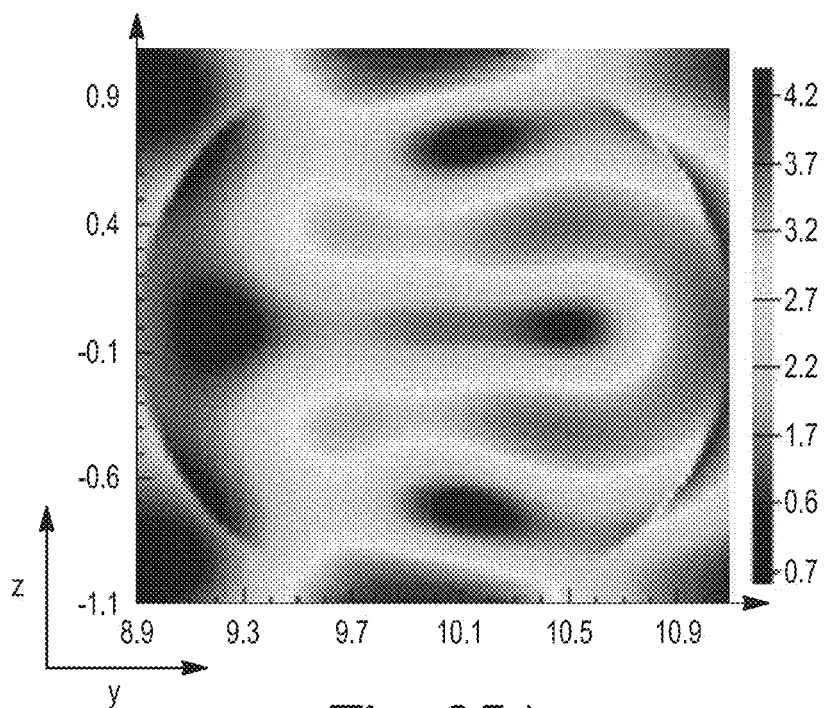
Figure 25B:
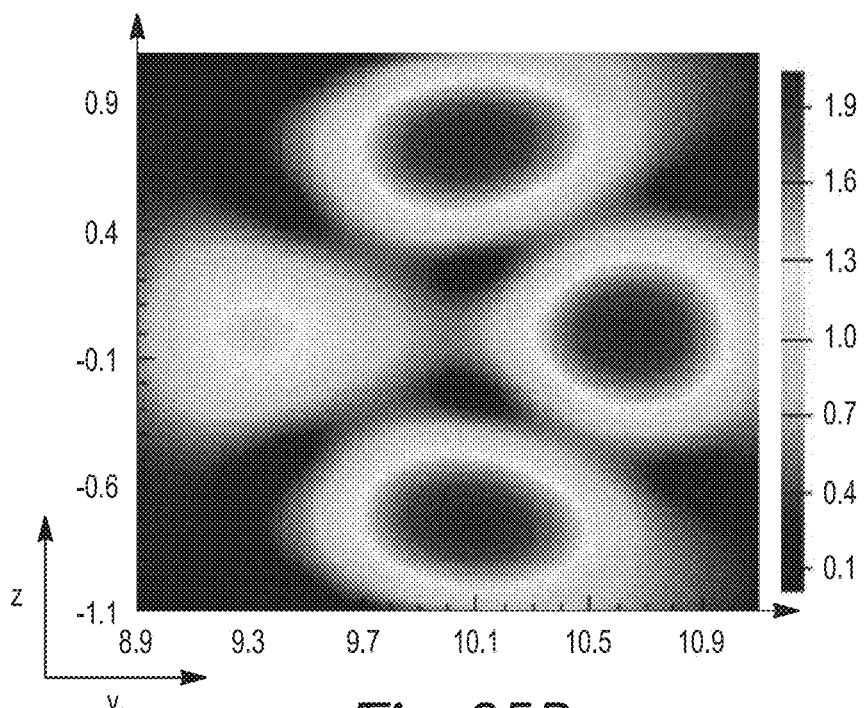

Meanwhile, both MD and electric dipole (ED) modes are excited simultaneously within an MHP at the same wavelength (FIGS. 8G-8H). The presence of ZnO needles excites additional ED that undergoes spectra redshift due to the "dressing" effect towards spectral location of the MD that is present within the PS core cavity. Such simultaneous excitation of the two fundamental modes causes suppression of scattering in the backward direction. This is due to opposite parities of the angular functions $\tau_n$ and $\pi_n$ in the scattering intensities I, leading to destructive interference in the backward direction. In fact, the ED and MD fundamental modes are co-excited within the M-HP across the spectrum in Region 1 (FIGS. 25A-25B). Meanwhile higher order modes are excited within a PS µ-sphere of equivalent diameter to the HPs (r=1.1 µm), showing magnetic quadrupole (MQ) and electric quadrupole (EQ) modes when irradiated with $\lambda=2437$ nm and 2192 nm, respectively (FIGS. 8C-8D and 25A-25B).

Figure 26:
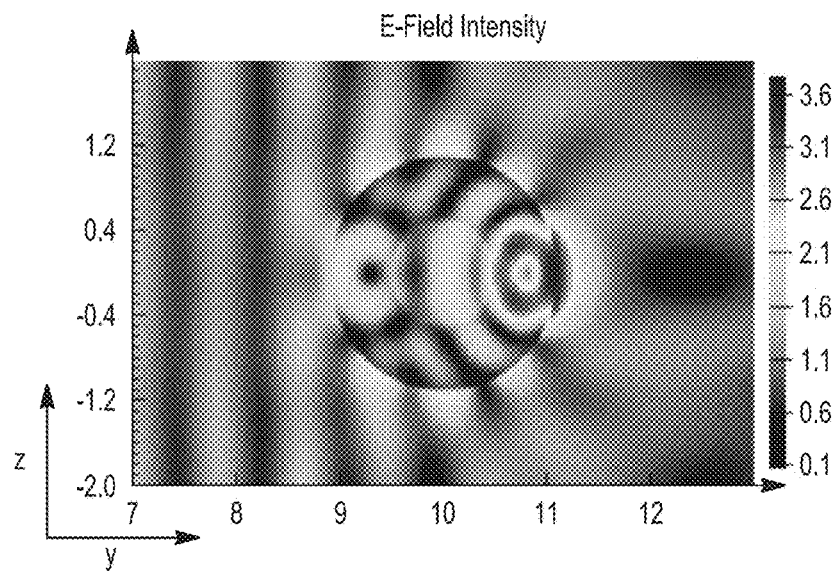
Figure 27A:
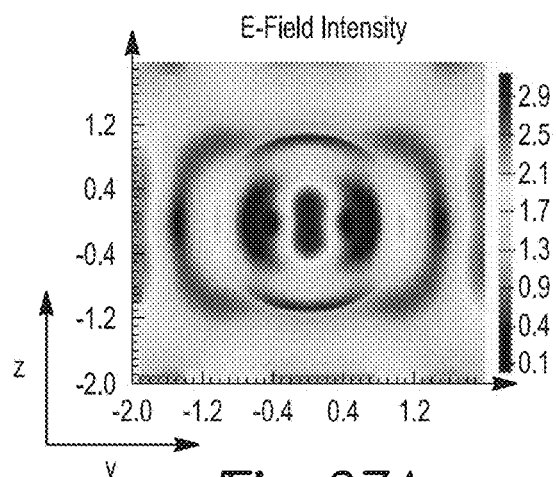
Figure 27B:
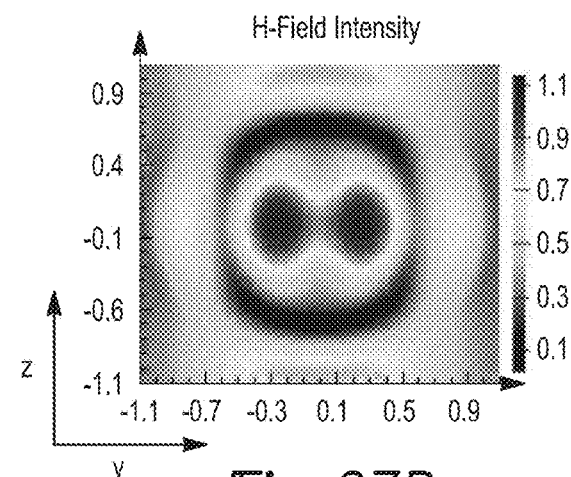
Figure 27C:
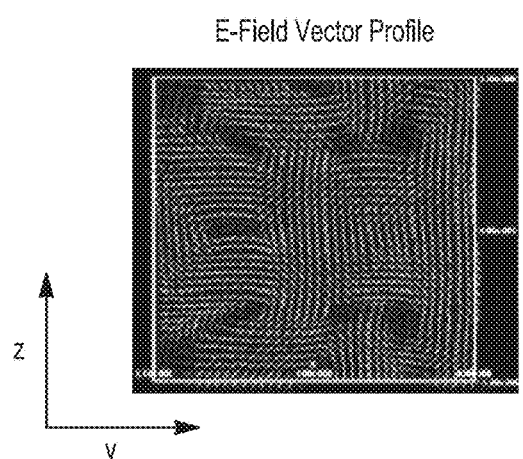
Figure 27D:
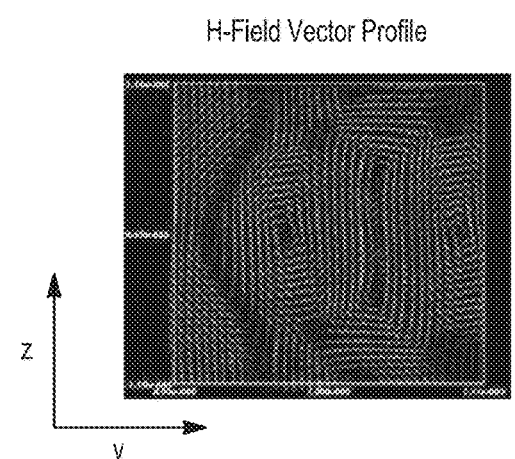
Figure 28:
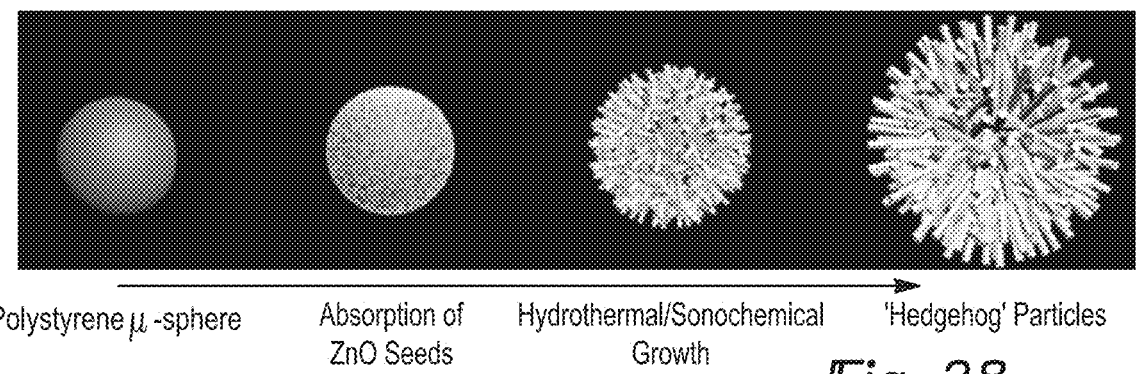
FIG. 28 shows a method for fabricating a hedgehog particle, where a polystyrene μ-sphere first has ZnO nanoparticle seeds adsorbed on a surface, followed by hydrothermal/sonochemical growth of the needles.
Figure 29:
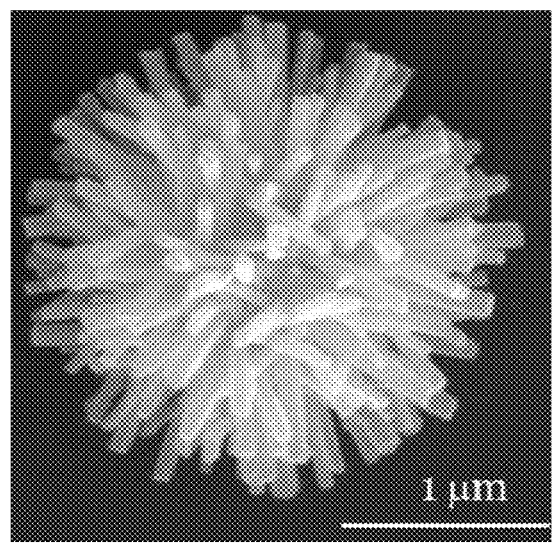
FIG. 29 shows a magnified image of a hedgehog particle. Scale bar is 1 μm.

In Region 2, where F/B>200 occurs at lower wavelengths, Mie theory predicts the presence of higher-order multipoles due to its sufficient sizes and refractive indices. However, in place of higher modes, the fundamental ED and MD modes are co-excited within the M-HP when illuminated with $\lambda$=1575 nm, similar to the profiles in Region 1. Here the spiky needle features at the interface suppresses the higher-order modes which would occur if a smooth and solid shell of equivalent thickness were present (FIG. 26) in place of the needles; in the HP, higher-order modes, characterized by peripheral concentration of E-field, become "lossy" due to radiative damping at the "leaky" periphery. On the other hand, higher order multipole is observed within a PS μ-sphere with equivalent diameter to the HP, in which the near-field profile suggests excitation of magnetic octupole (MO) modes when illuminated with $\lambda$=1575 nm (FIGS. 8E-8F and 27A-27D).

Higher-order modal damping had also been previously reported with plasmonic "rough" nanoparticles. Here, the "rough" plasmonic particles constitutes core diameter that falls at the border of the Rayleigh and the Mie regime, while the surface roughness features lie well within the Rayleigh scattering. Their differences lie in the preservation of resonant oscillation, accompanied by near-field enhancement.

Thus, hedgehog particles prepared in accordance with certain aspects of the present disclosure exhibit broadband suppression of backscattering and enhancement of forward scattering. Further, ZnO nanoneedles of the hedgehog particles have a role in shaping the near-field profiles that leads to such useful scattering anisotropy. Due to scaling invariance in the Maxwell's equation, through proper size selections, the scattering anisotropy may be expanded to visible as well as millimeter wave regions where a large majority of current practical photovoltaic devices operate. For example, in order to suppress reflection and magnify light collection in the photo-active areas, surfaces of solar cells are typically coated with either dielectric nanoparticles of high refractive indices or metallic nanoparticles which pose high costs, absorptive losses, environmental disturbances and limited FB ratio at much narrower band. Nano-structural patterning via top-down fabrication has also been proposed which presents manufacture challenges and production inefficiencies. Meanwhile, the hedgehog particles (HPs) provided by the present teachings are inexpensive and simple to fabricate. Furthermore, such HPs are easily aerosolized which facilitates spray coating on any surfaces. By reducing the overall dimension of the HPs to less than 1 μm, broadband light transmission towards the photo-active areas will be achieved in the visible spectrum, which will maximize the solar cell efficiencies. It should also be noted that incorporating hydrophobic HPs represents further added value in the form of self-cleaning surfaces, as binary surface roughness of HPs enable superhydrophobicity and the "lotus effect." In addition to optical devices and photonics, robust modeling and optical characterization of "rough" particles can be used for a variety of application. For example, accurate description of aerial aerosols may enable better characterization of EM radiation through the atmosphere and better assessment of their climatic impact. Its utility may span to precise characterization of biological entities that use light scattering, such as flow cytometry.

FIGS. 9A-9B show spectroscopy measurements (absorbance unit, A.U.) and FDTD based calculations of extinction cross-section ($\sigma_{ext}$) for polystyrene μ-sphere and ZnO nanowire in water. FIGS. 10A-10D show an FDTD simulation of a ZnO nanowire sphere in water. More specifically, spectral contribution to $\sigma_{ext}$ in a single ZnO nanospike in water is shown in FIGS. 10A-10B. In FIG. 10A, absorption cross-section ($\sigma_{abs}$) and FIG. 10B scattering cross-section ($\sigma_{scat}$) for l=190 nm, 270 nm, 400 nm, 600 nm are shown. In FIGS. 10C-10D, peak normalized $\sigma_{abs}$ is shown in FIG. 10C, with $\sigma_{scat}$ from FIGS. 10A and 10B, respectively. The width of nanoneedles are w=120 nm for all the lengths considered.

FIGS. 11A-11C show spectral contribution to $\sigma_{ext}$ in a single ZnO needle/nanospike (of different width). FIGS. 11A-11B show peak normalized $\sigma_{abs}$ and $\sigma_{scat}$ respectively. FIG. 11C shows $\sigma_{ext}$ of a ZnO nanospike with widths of w=50 nm, 75 nm, 100 nm, 120 nm, 150 nm, and 200 nm. The length of the ZnO nanospike is l=600 nm for all widths considered.

FIG. 12 shows $\sigma_{ext}$ of a ZnO nanowire (NW) (w=120 nm, l=600 nm) in water at various orientations relative to the incident plane wave; parallel to the incident light (solid line), at 45° angle of incidence (dotted line) and perpendicular to the incident light (perforated line).

FIGS. 13A-13F show a model hedgehog particle (M-HP) constructed from computed aided design software (3D Max Studio). The model HP is constructed by layering ZnO nanopyramids on PS μ-sphere onto which the ZnO nanospikes are scattered to create imperfect orthogonalization that reflects the experimental construct. The spherical format of ZnO nanospikes only (without the nanopyramids) are exported to the FDTD based simulation software (FDTD Solutions, Lumerical Inc.) in which PS μ-sphere is inserted in a way that there is no void space between the spherical array of ZnO nanospikes and the μ-sphere.

FIGS. 14A-14B show FDTD based theoretical calculation of $\sigma_{ext}$ of HP in water using FDTD method. FIG. 14A shows P.N. $\sigma_{ext}$ of two HPs at a separation distance, d=700 nm. The line (i) corresponds to 2 HPs, each having N=500, w=120 nm, l=600 nm. The line (ii) corresponds to 2 HPs, each having N=500, w=100 nm, l=600 nm. The line (iii) corresponds to 2 HPs, where one HP is comprised of N=500, w=100 nm, l=600 nm and the other HP is comprised of N=500, w=120 nm, l=600 nm. The $\sigma_{ext}$ of the heterogeneous mixture (iii) lies in between that of the two homogenous mixtures (lines (i) and (ii)). FIG. 14B shows there is an excellent spectral overlap between the FDTD-based $\sigma_{ext}$ of 2 HP mixture (line iv, FIG. 14A) and spectroscopic measurement of a collection of HPs in aqueous suspension (black perforated). The spectroscopic measurement is representative of average light extinction due to a collection of HPs having slight variations in overall interfacial geometry FIG. 15 shows spectral contribution $\sigma_{ext}$ in a single hedgehog particle (HP); contribution of $\sigma_{abs}$ (dotted) and $\sigma_{scat}$ (perforated) to the total $\sigma_{ext}$ of a single HP (N=500, w=120 nm and l=600 nm).

Thus, FIGS. 13, 14A-14B, and 15 show FDTD simulations of a model hedgehog particle in water. Complex refractive index (ñ) of ZnO (PV Lighthouse) is converted to complex dielectric function ($\tilde{\varepsilon}$), $$\tilde{\varepsilon}=\varepsilon'+i\varepsilon''$$

$$\tilde{n}=n+ik$$

$$\varepsilon'=n^2-k^2$$

$$\varepsilon''=2nk$$

to which Maxwell-Garnett EMA was applied for each shell layers in the triple-shell model.

$$\overline{\varepsilon^{MG}} = \varepsilon_m \frac{\varepsilon_i + 2\varepsilon_m + 2f(\varepsilon_i + \varepsilon_m)}{\varepsilon_i + 2\varepsilon_m - f(\varepsilon_i - \varepsilon_m)}$$

The Lumerical Solutions automatically converts to complex dielectric function to the complex refractive index, FIGS. 16A-16E show electric field (E-field) coupling between the ZnO nanospikes in a 3×3 array and its spectral shift. FIGS. 16A-16D show a 3×3 array of parallel ZnO nanospikes (w=120 nm, l=600 nm) oriented parallel to the incident light (λ=400 nm and λ=704 nm) at separation distance (d) of (FIG. 16A) d=20 nm, (FIG. 16B) d=50 nm, (FIG. 16C) d=100 nm, (FIG. 16D) d=200 nm; and (FIG. 16E) $\sigma_{ext}$ of orientations (FIGS. 16A-16D).

FIG. 19 shows spectral contribution to $\sigma_{ext}$ in a triple-shell model; contribution of $\sigma_{abs}$ (dotted) and $\sigma_{scat}$ (perforated) to the total $\sigma_{ext}$ of a single triple-shell representation of HP (N=265, w=120 nm and l=600 nm, 1:1:1).

FIGS. 22A-22B show suppression of backscattering and enhanced forward scattering by a HP in air. Destructive interference in the backward scattering for simultaneous excitation of electric and magnetic dipole modes is explained as follows: Scattering intensity, I, is expressed as follows:

$$I = \frac{1}{k^2 s^2}[|T_1(\cos\theta)|^2 \sin^2\varphi + |T_2(\cos\theta)|^2 \cos^2\varphi]$$

$$T_1(\cos\theta) = \sum_{n=1}^{\infty} \frac{2n+1}{n(n+1)}[a_n \pi_n(\cos\theta) + b_n \tau_n(\cos\theta)]$$

$$T_2(\cos\theta) = \sum_{n=1}^{\infty} \frac{2n+1}{n(n+1)}[a_n \pi_n(\cos\theta) + b_n \tau_n(\cos\theta)]$$

where $a_n$ and $b_n$ are Mie coefficients (nth order electric and magnetic moments, respectively), $\pi_n$ and $\tau_n$ are angular functions, θ and φ are polar and azimuthal angle, k is the wave number and s is the distance between the scattering center and the observation point. The angular function takes the form of associated Legendre functions, $$\pi_n(\cos\theta) = \frac{P_n^1(\cos\theta)}{\sin\theta}$$

$$\tau_n(\cos\theta) = \frac{dP_n^1(\cos\theta)}{d\theta},$$

and has the opposite parities with respect to cos θ, $$\pi_n(-\cos\theta) = (-1)^{n+1}\pi_n(\cos\theta)$$

$$\tau_n(-\cos\theta) = (-1)^n \tau_n(\cos\theta)$$

Hence, in the case of simultaneous excitation of dipole modes only, destructive interference occurs in the backward direction, θ=180°. When $a_n=b_n$ (equal magnitude electric and magnetic dipole), zero backscattering occurs, known as first Kerker condition.

FIGS. 24A-24H show near field profiles of the model HP showing co-excitation of ED and MD modes across the spectrum in a region corresponding to a wavelength of 2075 nm to 2690 nm.

Figure 30:
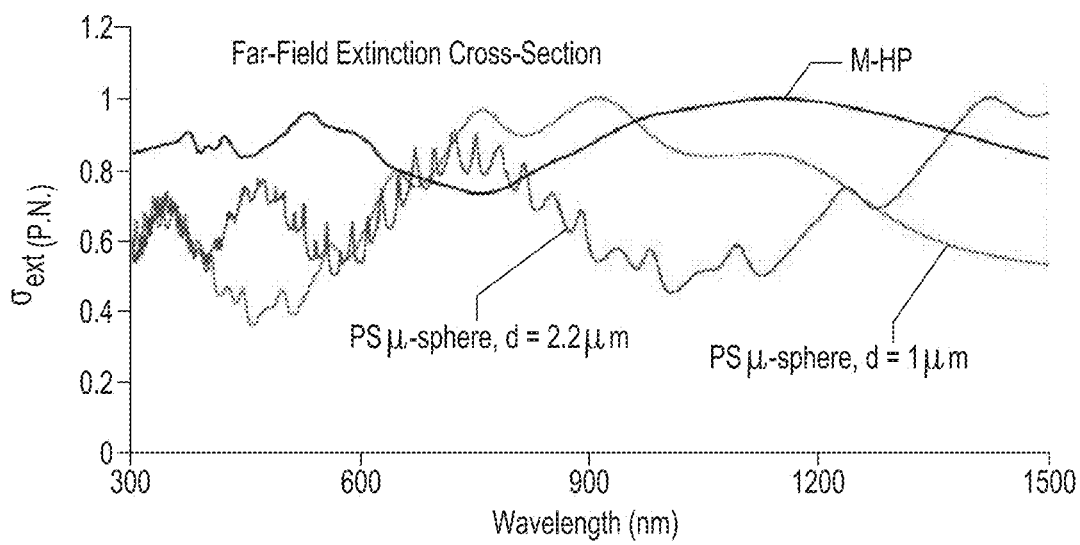
FIG. 30 shows far-field extinction cross-section ($\sigma_{ext}$) versus wavelength for 2 comparative PS μ-sphere particles having different diameters (1 μm and 2.2 μm) as compared to a hedgehog particle prepared in accordance with certain aspects of the present disclosure.

FIG. 30 shows far-field extinction cross-section ($\sigma_{ext}$) versus wavelength for 2 comparative PS μ-sphere particles having different diameters (1 μm and 2.2 μm) as compared to a hedgehog particle prepared in accordance with certain aspects of the present disclosure.

FIGS. 31A-31D. (a)-(b) show Electric field (E-field) intensity distribution for two side-by-side hedgehog particles prepared in accordance with certain aspects of the present disclosure with no separation distance (λ of 849 nm in (a) and 454 nm in (b)), where a coupling-free effect is observed between hedgehog particles. (c)-(d) show E-Field intensity for two comparative side-by-side polystyrene microspheres, where a coupling effect is shown.

FIG. 32 shows non-resonant scattering of a model hedgehog particle in air with extinction ($\sigma_{ext}$) versus wavelength for hedgehog particles prepared in accordance with certain aspects of the present disclosure.

FIG. 33 shows variations in different hedgehog particles prepared in accordance with certain aspects of the present disclosure, where the hedgehog particles have nanospikes or needles with different widths, namely w=75 nm, w=100 nm, and w=120 nm.

FIG. 34 shows a theoretical calculation of extinction cross-section ($\sigma_{ext}$) versus wavelength for colloidal hedgehog particles in water, where the hedgehog particles have nanospikes or needles with different widths, namely w=75 nm, w=100 nm, and w=120 nm.

FIG. 35 shows a theoretical calculation of extinction cross-section ($\sigma_{ext}$) versus wavelength and experimental data for colloidal hedgehog particles in air. FIG. 36 shows a theoretical calculation of extinction cross-section ($\sigma_{ext}$) versus wavelength and experimental data for colloidal hedgehog particles in water. FIG. 37 shows extinction cross-section ($\sigma_{ext}$) versus wavelength for comparison, including a comparative PS μ-sphere particle, a ZnO nanowire array in a spherical format, and a hedgehog particle prepared in accordance with certain aspects of the present disclosure.

FIG. 38A shows a substrate dressing effect for a spherical ZnO nanowire array having a diameter of about 2.2 μm. FIG. 38B shows a substrate dressing effect for a hedgehog particle prepared in accordance with certain aspects of the present disclosure having a diameter of about 2.2 μm.

FIG. 39 shows multiple regions where backscattering (normalized power) is suppressed in comparing a PS μ-sphere particle, a ZnO μ-sphere particle, and a hedgehog particle prepared in accordance with certain aspects of the present disclosure.

FIG. 40 shows multiple regions where forward scattering is enhanced by showing a ratio of forward scattering to back scattering (FB) for a PS μ-sphere particle, a ZnO μ-sphere particle, and a hedgehog particle prepared in accordance with certain aspects of the present disclosure.

FIGS. 41A-41B. Comparison of backscatter suppression for a PS μ-sphere particle and a hedgehog particle (HP) prepared in accordance with certain aspects of the present disclosure. E-field intensity and H-field intensity are shown for both particles in regions 1 and 2 corresponding to wavelengths of 2,423 nm and 1,575 nm.

Suppression of Resonance: Resonant mode is significantly suppressed in the hedgehog particles (HP), as discussed above. Despite its size and constitutive properties, HP exhibit non-resonant Mie scattering. Coupling-free effect between HPs—a 2 model HPs side by side with no separation distance (Hedgehog particles and polystyrene μ-spheres.

Spectral overlap between single and multiple HPs indicating coupling-free effect (non-resonant).

The optical devices incorporating hedgehog microparticles provide broadband light scattering. Broadband extinction is demonstrated that is atypical of low index colloids.

For example, as shown in FIG. 37, a broadband peak $P_1$ from visible to NIR, narrower peak $P_2$ near UV. However, there is no spectral correlation with its individual components (PS μ-sphere, ZnO NW).

Additionally, spectral tuning easily achieved with changes in corrugation geometry.

Further, the origin of broadband scattering peak $P_1$ is shown in FIGS. 38A-38B. Spherical construction of the ZnO NW array is responsible for broadband peak (P1) at higher wavelength. Peak shift from $P^*_1$ to $P_1$ is due to substrate dressing effect within the particle in the presence of polystyrene μ-sphere.

FIG. 39 shows multiple regions where backscattering (normalized power) is suppressed in comparing a PS μ-sphere particle, a ZnO μ-sphere particle and a hedgehog particle prepared in accordance with certain aspects of the present disclosure.

FIG. 40 shows multiple regions where forward scattering is enhanced by showing a ratio of forward scattering to back scattering (FB) for a PS μ-sphere particle, a ZnO μ-sphere particle, and a hedgehog particle prepared in accordance with certain aspects of the present disclosure. Two regions are formed with enhanced forward scattering where a FB ratio is greater than 200. A first region has a wavelength of 2,075 nm to 2,690 nm, while a second region has wavelengths of 1,509 nm and 1,674 nm.

FIGS. 41A-41B show comparison of backscatter suppression for a PS μ-sphere particle and a hedgehog particle (HP) prepared in accordance with certain aspects of the present disclosure. Thus FIGS. 41A-41B generally show a mechanism for backscattering. Concurrent excitation of ED and MD modes in HPs can be observed. E-field intensity and H-field intensity are shown for both PS and HP particles in regions 1 and 2 corresponding to wavelengths of 2,423 nm and 1,575 nm. Spectral overlap between ED and MD modes causes destructive interference in backscattering. Higher order cavity modes are suppressed in HPs. Higher order resonance occurs in polystyrene (PS) m-spheres of equivalent diameter to HPs.

In summary, EM responses of particles having high surface roughness deviate from Mie theory. Interfacial roughness can be utilized to design EM responses of particles. In certain aspects, the hedgehog particles prepared in accordance with certain aspects of the present disclosure exhibit broadband extinction from visible to NIR ranges of wavelength. At this spectrum, a spherical arrangement of orthogonal ZnO needle array is believed to govern structural factor for the broadband scattering. Further, for suppression of backscattering, a spectral overlap of ED and MD modes causes destructive interference towards backward direction. Enhancement of forward scattering non-resonant form of light scattering is strictly forward directional.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An optical device comprising:
 an optical material comprising a plurality of microparticles, wherein each respective microparticle comprises a core region and a plurality of needles defining a shell region fully surrounding the core region, wherein the core region is formed of a first material having a first refractive index and the plurality of needles is connected to and substantially orthogonal to a surface of the core region so that the plurality of needles fully surrounds the core region, wherein the plurality of needles comprise a second material having a second refractive index and each respective needle of the plurality has an average length of less than or equal to about 750 nm, wherein the optical material enhances forward scattering of a predetermined wavelength of light, while suppressing backscattering the predetermined wavelength of light.

2. The optical device of claim 1, wherein the first material is selected from the group consisting of: polystyrene and silica.

3. The optical device of claim 1, wherein the second material comprises zinc oxide (ZnO).

4. The optical device of claim 1, wherein each needle further comprises a third material coated over the second material.

5. The optical device of claim 4, wherein the third material is selected from the group consisting of: coated titania ($TiO_2$), gold nanoparticles, silver nanoparticles, CdTe quantum dots, and combinations thereof.

6. The optical device of claim 1, wherein the average length is greater than or equal to about 200 nm to less than or equal to about 750 nm.

7. The optical device of claim 1, wherein each respective core has an average diameter of greater than or equal to about 900 nm to less than or equal to about 5 μm.

8. The optical device of claim 1, wherein the predetermined wavelength of light is infrared or near-infrared electromagnetic radiation.

9. The optical device of claim 1, wherein the optical material is a film comprising the plurality of microparticles.

10. The optical device of claim 1, wherein the optical material is a coating comprising the plurality of microparticles deposited on a substrate.

11. The optical device of claim 1, wherein the optical material comprises the plurality of microparticles distributed in air.

12. The optical device of claim 1, wherein greater than or equal to about 50% of the predetermined wavelength of light directed at the optical material is transmitted through the optical material.

13. The optical device of claim 1, wherein greater than or equal to about 99% of the predetermined wavelength of light directed at the optical material is transmitted through the optical material and less than 1% of the predetermined wavelength of light backscatters.

14. The optical device of claim 1, wherein greater than or equal to about 65% of the predetermined wavelength of light directed at the optical material is transmitted through the optical material, wherein the predetermined wavelength ranges from greater than or equal to about 1,400 nm to less than or equal to about 1,600 nm.

15. The optical device of claim 1, wherein greater than or equal to about 75% of the predetermined wavelength of light directed at the optical material is transmitted through the optical material, wherein the predetermined wavelength ranges from greater than or equal to about 800 nm to less than or equal to about 887 nm.

16. The optical device of claim 1, wherein the optical material has a ratio of forward scattering to backscattering of greater than or equal to about 200.

17. The optical device of claim 16, where the predetermined wavelength ranges from greater than or equal to about 1,236 nm to less than or equal to about 1,655 nm.

18. A method of controlling transparency in an optical material, the method comprising:

directing a predetermined wavelength of light towards an optical material comprising a plurality of microparticles having a forward scattering to backscattering ratio of greater than or equal to about 200 for the predetermined wavelength of light, wherein each respective microparticle comprises a core region and a plurality of needles defining a shell region fully surrounding a surface of the core region, wherein the core region is formed of a first material having a first refractive index and the plurality of needles connected to and substantially orthogonal to a surface of the core region so that the plurality of needles fully surrounds the core region, wherein the plurality of needles comprise a second material having a second refractive index and each respective needle of the plurality has an average length of less than or equal to about 750 nm.

19. The method of claim 18, wherein greater than or equal to about 99% of the predetermined wavelength of light directed towards the optical material is transmitted through the optical material and less than 1% of the predetermined wavelength of light backscatters.

20. The method of claim 18, wherein greater than or equal to about 65% of the predetermined wavelength of light directed towards the optical material is transmitted through the optical material, wherein the predetermined wavelength ranges from greater than or equal to about 1,400 nm to less than or equal to about 1,600 nm.

21. The method of claim 18, wherein greater than or equal to about 75% of the predetermined wavelength of light directed towards the optical material is transmitted through the optical material, wherein the predetermined wavelength ranges from greater than or equal to about 800 nm to less than or equal to about 887 nm.

22. The method of claim 18, wherein the predetermined wavelength ranges from greater than or equal to about 1,236 nm to less than or equal to about 1,655 nm.

* * * * *